United States Patent [19]

West

[11] Patent Number: 5,740,440
[45] Date of Patent: Apr. 14, 1998

[54] DYNAMIC OBJECT VISUALIZATION AND BROWSING SYSTEM

[75] Inventor: Alan A. West, Glasgow, Scotland

[73] Assignee: Objective Software Technology, Almondvale North Livingston, England

[21] Appl. No.: 369,489

[22] Filed: Jan. 6, 1995

[51] Int. Cl.$^6$ ................................................. G06F 17/30
[52] U.S. Cl. ........................ 395/704; 395/614; 395/348
[58] Field of Search ........................... 395/600, 614, 395/615, 118, 500, 140, 501, 348, 349, 704; 364/578

[56] References Cited

U.S. PATENT DOCUMENTS

| | | | |
|---|---|---|---|
| 4,885,717 | 12/1989 | Beck et al. | 364/900 |
| 5,093,914 | 3/1992 | Coplien et al. | 395/700 |
| 5,339,433 | 8/1994 | Frid-Nielsen | 395/700 |
| 5,361,351 | 11/1994 | Lenkov et al. | 395/700 |

OTHER PUBLICATIONS

Turbo Debugger User's Guide 2.5 Borland International, Jan. 1988, pp. 15–23, 77–132, 159–167.

*Primary Examiner*—Thomas G. Black
*Assistant Examiner*—Donald Min
*Attorney, Agent, or Firm*—Kudirka & Jobse, LLP

[57] ABSTRACT

A method to automatically monitor an object-oriented program, e.g., for debugging purposes, is characterized by the steps of determining a state of the digital data processor at selected points during execution of the program and, from that state, determining the status of objects created the program. The method also contemplates generating an animated graphical display reflecting the status of those selected objects, and their interrelationships, substantially concurrently with execution of the program.

28 Claims, 21 Drawing Sheets

Subsystem Structure

Main Processing Stages

Program Model: Class Relationship Diagram

High Level Method Event Processing

Constructor Call Event Processing

Destructor Call Event Processing

Method Return Event Processing

Destructor Return Event Processing

First-Reference Initial Processing

First-Reference Secondary Processing

Full-Reference Processing

Object::One level Deference Check

Method Call::Check Local Variables

Object::Check Reference Change

User Interface - before reparenting

User Interface - object querying

User Interface - after reparenting

Binary Tree Based Structure

List-Based Tree Structure

Doubly-Linked List Structure

Array-Based Table

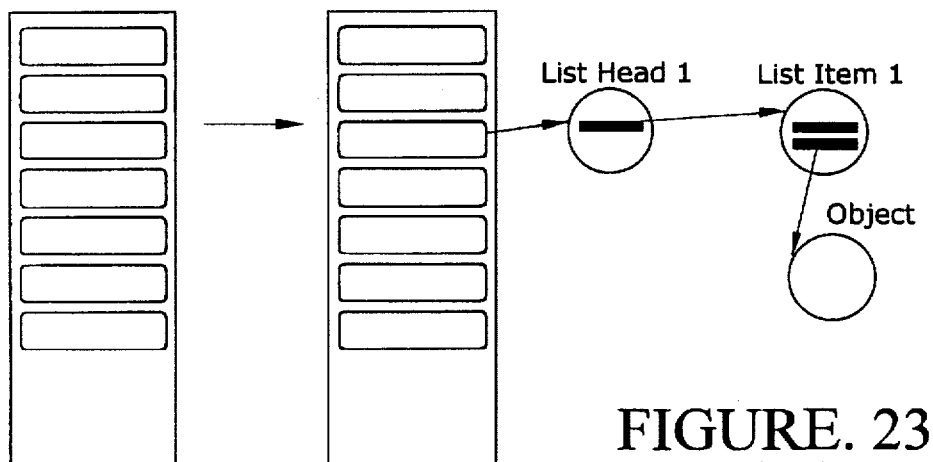
FIGURE. 23
List-Based Hash Table Structure
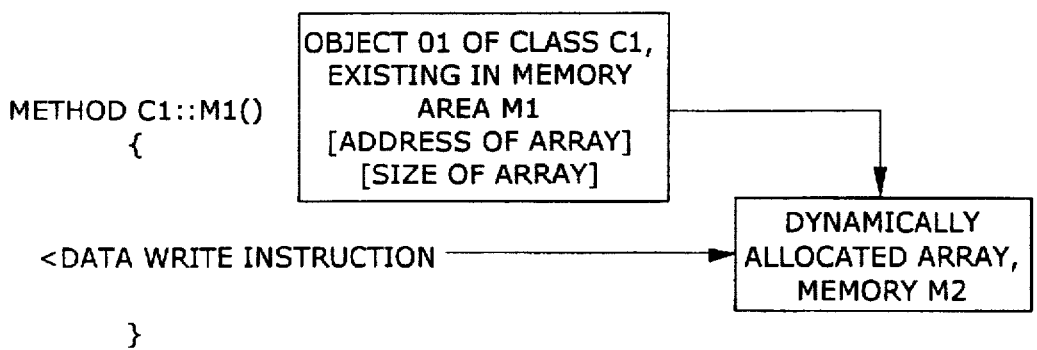
FIGURE. 23A
Filter No Internal Calls (from.id==to.id)
{
exclude;
}
Filter Not from Class 1 (from.class.name==Class 1 &&
                        from.parent.name==Object 1)
{
exclude;
}
FIGURE 24
Filter Examples User interface:
stage duriong object tree layout User Interface- layout algorithm

DYNAMIC OBJECT VISUALIZATION AND BROWSING SYSTEM

FIELD OF THE INVENTION

This invention relates to digital data processing and, more particularly, to program development tools for improved monitoring and debugging of object-oriented computer programs.

BACKGROUND OF THE INVENTION

A modern computer comprises a general purpose hardware system including a processor and a memory. The processor is controlled by a computer program, or an ordered set of commands which are stored in the memory. During operation of the computer, the commands are retrieved, one-by-one from the memory and are "executed" to cause the processor to perform some function.

At the hardware level, each command is a number which is specially identified to the processor as a command. As a typical program may consist of thousands, if not millions, of command numbers, the steps comprising a computer program are usually written as a series of human-readable text statements to make them easier to understand. The text statements are constructed in accordance with the syntax and grammar of a high level language where one text statement may correspond to one or more numbered commands. The collection of text statements are called a "source" program. Before it can be run or executed on the processor, the source program must be translated by another program called a "compiler" into a set of command numbers or machine instructions which the processor can then execute to process information.

Although the source code is human-readable, programs are often so complex that a program, as initially written, is not correct and contains faults or "bugs". Consequently, a process called "debugging" must be performed in which the program is executed, the bugs identified and corrected and the program rerun to determine whether further bugs remain. If the people debugging the code did not originally write the code, then they must first understand how the program is intended to work before it can be modified during the debugging process.

Due to the complexity of programs, even if the source code is easily readable, it is extremely difficult to understand and debug the program by simply examining a list of source code statements. Therefore, in order to simplify the debugging process, information concerning the program operation and control is commonly organized and presented at a more abstract level.

For example, in order to facilitate both comprehension of program operation and the debugging operation, another program called a "debugger" is generally used during the debugging process. The debugger controls program operation by inserting "breakpoints" into the program. A breakpoint is a special command which transfers program control to the debugger program. After control is transferred to it, the debugger allows various parts of the program, such as variables, to be examined and possibly modified.

Such a debugger operates in a satisfactory manner with a traditional "procedural" program which comprises a list of commands which operate upon a data set. The program control and "flow" is determined by the command statements and any of the command statements can act upon the data. Conventional debuggers typically display both the source code text and the screen display generated by the program as it runs. As previously mentioned, breakpoints can be inserted to stop the program at a particular point and the person doing the debugging can step through the source code program a line at a time and view the screen display and variables as they change. This model of displaying program execution is the highest level possible for traditional procedural programs.

A line-by-line debugger is not as effective with object-oriented programs as it is with procedural programs. Object-oriented (or, simply, "object") programming techniques are becoming increasingly important in software development. In particular, in an object-oriented program, the data on which the program operates is broken into several smaller pieces, each of which is then combined with source code statements that generate commands to modify the data piece. The combination of the data and commands is called an "object". In general, the "objects" in an object-oriented program are defined by a set of statements, called a class, which acts as a template for creating the object. The actual objects (each including structures for storing data and commands to act on that data) are only created when the program is run.

Consequently, object-oriented programs are configured as a set of intercommunicating objects, each of which is an instance of a particular class definition. When a program is run, the objects are created and destroyed dynamically. It is possible to use a traditional debugger with object-oriented programs because the class statements which define the objects are still usually written as lines of source code text. However, since objects are dynamically created and destroyed during program operation and objects may themselves create and destroy other objects, the debugger line-by-line display tends to jump from object to object during program operation, resulting in a somewhat chaotic and confusing display. Therefore, it is difficult to understand the operation of the program and the interrelationships between the objects by stepping through the code line-by-line.

Accordingly, object displays called "class browsers" have been developed. These class browsers use the class information to generate a screen display which illustrates how the various objects in an object-oriented program are related. Often the displays are graphical in nature and illustrate in a simple manner the desired relationships. However, conventional class browsers are "static" in that they merely show possible relationships between objects as defined in the class definitions before, or after, the program is run. The browsers cannot generally be run simultaneously with the program and thus cannot display the objects as they are actually created and destroyed dynamically during program operation. Thus, they have a very limited value in debugging because the potential relationships may not be the actual relationships which occur during program operation.

Some attempts have been made to produce animated displays that illustrate the operation of a software program as it is being run. For example, animation of algorithms is described in M. H. Brown, "Algorithm Animation," *ACM Distinguished Dissertations Series*, MIT Press (1988); while, animation of processes in concurrent systems is disclosed by Burke, T. P. Domae and G. F. Johnson, "An Extensible Distributed Object Management System, EDOMS," *Proceedings of the Second International Conference TOOLS—Paris* 1990, pp. 213–218. Though none of this work is related to the structure of object-oriented software, Kleyn, P. C. Gingritch, "GraphTrace—Understanding Object-Oriented Systems using Concurrently Animated Views," *ACM SigPlan Notices*, 23, 11 (1988), pp. 191—205, discloses animation of static structural components of an object-oriented program—i.e., animation of views of the classes, methods, and modules which made up the program. That animation may only be replayed after a run of the program has completed.

In view of the foregoing, an object of the invention is to provide improved software program development tools and, more particularly, improved tools for developing object-oriented programs.

More particularly, an object of the invention is to provide program development tools that permit monitoring and control of object-oriented programs at a higher analytic level than that provided by the prior art.

Still another object of the invention is to provide program development tools for object-oriented programs that permit better visualization of program execution.

SUMMARY OF THE INVENTION

The invention meets the foregoing objects, and others, by providing a method for monitoring execution of object-oriented programs through display of visual analogues of the objects present in the program. Displayed objects are visually related to one another according to reference relationships between them. Communications between the objects are also visually represented.

More generally, the invention provides—in one aspect—a method of monitoring execution of an object-oriented computer program on a digital data processor. The method is characterized by the steps of determining a state of the digital data processor at selected points during execution of the program and, from that state, determining the status of objects used by the program. The method also contemplates generating an animated graphical display reflecting the status of those selected objects, and their interrelationships, substantially concurrently with execution of the program. Filters can be applied to reduce the quantity of state-related information gleaned from the digital data processor, as well as the quantity of status-related information displayed to the user.

According to other aspects, the invention generates and utilizes static and dynamic program models representing the object and class constructs of the monitored program, along with its execution state, to facilitate interpreting the state-related information from the digital data processor. The static model can be generated from information supplied by a debugger interface loaded with the monitored program and from the definition of the monitored program itself (e.g., declarations contained in the program's "header" files). The dynamic model is generated and updated during execution of the program to represent the objects and their relationships during execution of the program, current methods under invocation, and other information concerning the state of said digital data processor.

According to one aspect of the invention, the dynamic program model includes an object i.d. table that maps object identifiers to storage addresses. That table can be updated during execution of the program in response to method calls to object constructors. Use of the table can speed subsequent identification of the objects and references to them.

In still another aspect, the invention contemplates setting breakpoints in the monitored program, e.g., using a debugger interface, to suspend its execution at selected points during execution. Those points can include method calls, method returns and memory writes. As execution suspends at the breakpoints, the state of the digital data processor and status of the monitored objects is determined so that the display can be updated. Execution of the program can be resumed, e.g., on command of the user.

Though all breakpoints can be set when the program is loaded, one aspect of the invention provides for initially setting only a limited number of breakpoints, to wit, those in constructor methods. When execution suspends on creation of an object (i.e., when its constructor is called), further breakpoints are set, e.g., at its method calls, method returns and memory writes.

According to other aspects, a method according to the invention responds to method calls for updating the display to represent invocation of the called methods and creation, if any, of objects including those methods. Likewise, the invention calls for responding to a method return for updating the display to represent completion of the corresponding method and destruction, if any, of the corresponding object.

The method of the invention provides, in related aspects, for determining whether an object in which a constructor method call is contained is newly created. This can be accomplished by examining the prior most recent method call and the type of that object. On identifying a newly created object, the object id table of the dynamic program model can be updated to include an identifier for the object and its storage address.

Newly created objects can be displayed, according to an aspect of the invention, in a "creation" (or "has created") relation to the object which created it. Graphically, for example, the newly created object can be placed below the creating object.

Other aspects of the invention call for updating these graphically depicted relationships as subsequent references are made between objects. Thus, in response to a method call having an argument designating an object amenable to reference, that object can be marked as a potential subject of reference. When the method returns, the object is checked to identify whether it has since been referenced by another and, if not, the object can be marked—and shown on the display—as being referenced by the object that issued the method call.

In a related aspect, the invention calls for responding to selected memory writes for determining whether the target address of that write is an object data member capable of storing an object reference and whether the value being written to that data member is itself an object. If so, the display can be updated to represent a referencing relationship between the object containing the data member of the target address and the object referred to by the value. If not, breakpoints (if any) set in the monitored program at the corresponding memory write can be removed.

Dynamically showing the objects and their relationships, through use of the invention, allows the state of the program to be immediately understood and allows details of the program state to be observed by direct interaction with the displayed visual analogues of objects and relationships. Many errors in object programs are detectable at the object-level: for example incorrect structuring of object inter-relationships; the invocation of methods in incorrect objects; use of deleted objects; invalid calling sequences. By directly visualizing object-level behavior, patterns in program behavior can be directly observed, allowing validation of correct behavior and easy error detection.

When used in conjunction with a conventional debugger interface, a method according to permits an program object-oriented program written in, for example, C++ to be monitored without changes to the source code. For languages supporting only dynamic binding, the message passing mechanism can be tapped into, providing a simpler source of low-level events.

These and other aspects of the invention are evident in the description that follows and in the attached drawings.

BRIEF DESCRIPTION OF THE DRAWINGS

A more complete understanding of the invention may be attained by reference to the drawings, in which:

FIG. 23 is a changing list-based hash table structure described in accordance with practice of the invention.

FIG. 23A illustrates the processing of a dynamically-allocated array described in accordance with the practice of the invention.

FIG. 24 shows two example dynamic filters for use in practice of the invention.

DETAILED DESCRIPTION OF THE INVENTION

Figure 1:
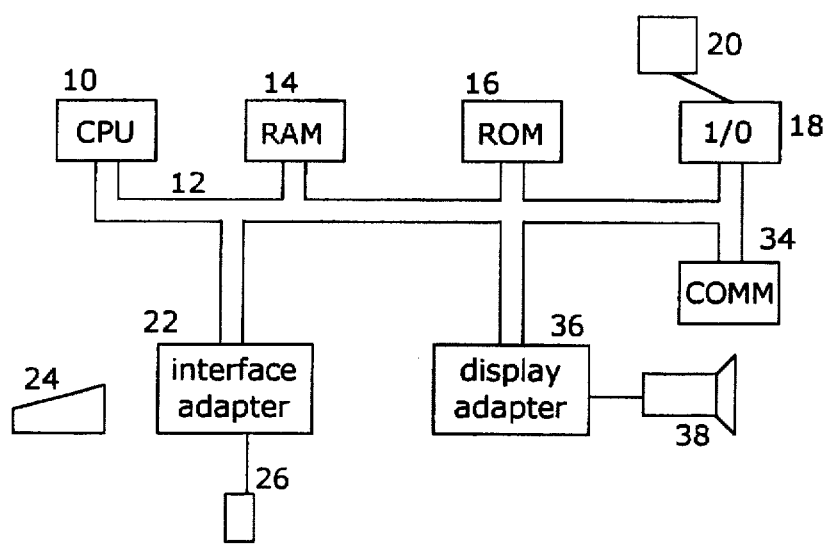
FIG. 1 is a block diagram of a personal or workstation computer system on which the invention may be practiced.

The invention may be practiced on a digital data processor and is preferably practiced in the context of a personal computer such as the IBM® PC range or a workstation such as the Sun SPAPC® range or IBM® RS6000 range. A representative hardware environment is depicted in FIG. 1, which illustrates a typical hardware configuration of a workstation for use in practice of the invention having a central processing unit 10, such as a conventional microprocessor and other units interconnected via a system bus 12. The workstation shown in FIG. 1 includes a Random Access Memory (RAM) 14, Read Only memory (ROM) 16, and I/O adapter 18 for connecting peripheral devices such as disk units 20 to the bus, a user interface adapter 22 for connecting a keyboard 24, a mouse 26, and/or other user interface devices, a communication adapter 34 for connecting the workstation to a data processing network, and a display adapter 36 for connecting the bus to a display device 38. The workstation has resident thereon an operating system such as Microsoft® Windows® or UNIX®.

In a preferred embodiment, the invention is implemented in the C++ programming language using object-oriented programming techniques. C++ is a compiled language—thus, C++ programs are written in a human-readable script which is translated by another program, called a compiler, which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc., and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects." These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to create a function which constructs the actual object. A class may, for example, specify the number and type of data variables and the steps involved in the functions which manipulate the data. An object is actually created in the program by means of the aforementioned special function called a constructor which uses additional information, such as arguments provided during object creation, to construct the object. Likewise objects are destroyed by a special function called a destructor. Objects may be used by invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. For example, in the C++ programming language, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars), which functions are included into a class hierarchy that defines a set of objects. After the functions have been defined, a program can later refer to the addition function by its common format (A+B) and the program will determine which of the three functions is actually being used by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

The construction and operation of a preferred embodiment of the invention is described below. Although that embodiment is intended for monitoring and controlling execution object-oriented programs written in the language C++, those skilled in the art will appreciate that its techniques are readily adaptable to display programs written in other object-oriented languages.

An embodiment as described below requires no changes to the source code of the monitored program. It merely requires that the monitored program be compiled and linked with standard debugging information, such as that produced under the debug compiling option of commercially available compilers, e.g., the C++ compiler of Microsoft Corporation.

Figure 2:
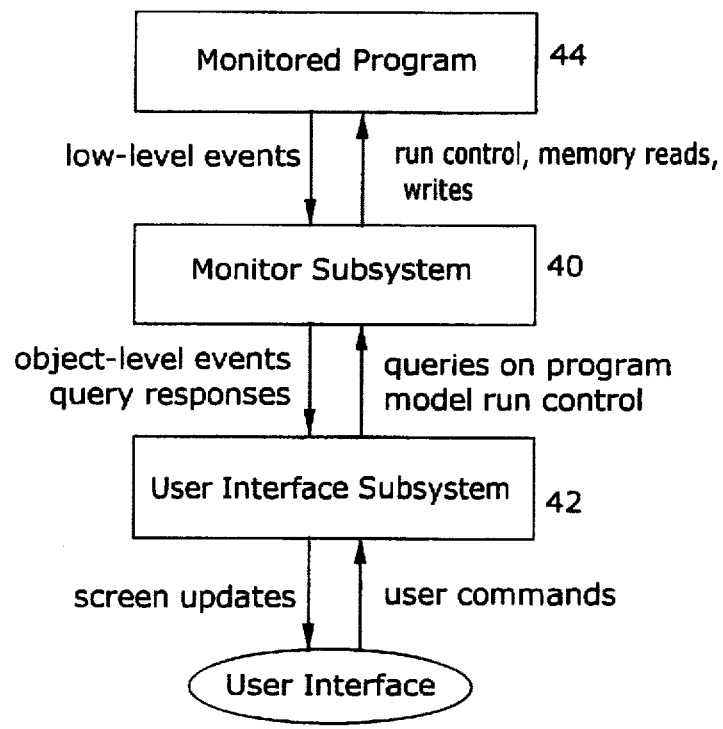
FIG. 2 is a diagram of subsystem intercommunication in the illustrated embodiment of the invention

As shown in FIG. 2, the illustrated embodiment includes two subsystems—a monitor subsystem 40 and a user interface subsystem 42. The monitor 40 interprets a stream of machine-level events which is generated from the monitored program 44, fetching extra information from the program to complete the interpretation. It continuously translates machine-level events into sets of object-level events. These are primarily the creation and destruction of objects; the creation of relationships between objects; and, the invocation of methods on one object by another. The stream of object level events is fed to the user interface 42 which graphically displays and animates the sequence as a graphical display of the objects, their relationships, and communication, as displayed at the user interface (including, e.g., monitor 38 and keyboard 24).

TERMINOLOGY

There is some ambiguity in the prior art with the terms used to describe object technology programs. This difficulty may be compounded where, as here, objects and classes of the illustrated embodiment are used to model objects and classes in the monitored program. To reduce confusion, the following terms will be used in these defined senses hereinafter:

object: lower case "object" means an object in the monitored program. The object is an instance of a class in the monitored program. It is a dynamic entity in the monitored program occupying a distinct area of memory class: lower case "class" is part of the source code for a monitored program. It is compiled into executable code. A class defines the format and operations for object instances of this class.

base class: a class may inherit from other classes, forming a class inheritance directed graph (it is a directed graph rather than a tree because of possible multiple inheritance).

base object: this is not a standard term but it is used here to mean that part of an object which is present because of the inheritance of a base class by the class of which the object has been created as an instance.

aggregate object: This is an object which is embedded in another object. Whenever an instance of the containing object is created an instance of the aggregate object must also be created.

method: Lower case "method" refers to a method in the monitored program. A method is an action which forms part of a class. The class defines a set of methods which can act on any object instance of that class to access or modify the data in the object. In C++ methods are called member functions, but method will be used here to distinguish these from functions in a procedural language.

Object: An upper case "Object" is the class in the monitor used to represent objects in the program. An instance of Object is created to model each object in the monitored program.

Class: An upper case "Class" is the class in the monitor used to model classes in the program. An instance of Class is created to model each class in the monitored program.

Method: An upper case "Method" is the class in the monitor used to model methods in the program. An instance of Method is created to model each method in the monitored program.

instance: To further differentiate between the objects in the monitored program and the program model, the term "object" is reserved for objects in the monitored program.

The word "instance" is used to mean objects in the program model; for example, an Object instance.

OBJECT PROGRAMS

Object programs are written as a set of classes. Each class defines the form any object instance of that class will take. It defines the data members that each object instance of that class will contain (the set of information contained in the object) and the set of behaviors of any object instance of that class (the set of methods that can be invoked on the object to access and modify its data). Methods can create and destroy object instances of other classes and invoke actions on them. Each class can inherit data and methods from other classes, which then become its base classes. C++ PROGRAMS The most popular object language is currently C++. Object programs are written in text format using an editor or word processor. They are then compiled using a C++ compiler into machine code for the target computer.

DEBUGGING INFORMATION

Debugging information is generated by the compiler to relate the generated machine code back to the source code. It defines the machine addresses at which program symbols and source code lines will appear, and it defines the types of all symbols used in the program.

Debugging information provided by current commercially-available debuggers of the type with which the illustrated embodiment is used is designed to support the operation of traditional source-level procedural debuggers. These show the active source line in a program when it halts execution, and allow execution to be stepped on a source line at a time. Breakpoints can be set on source lines or on functions to allow execution to be stopped at a particular point. Whenever execution is halted variables in the current scope can be examined manually. The type information in the debugging records allows variables in the program to be printed out with the correct format.

NEW OBJECT PROGRAM MODEL

Figure 4:
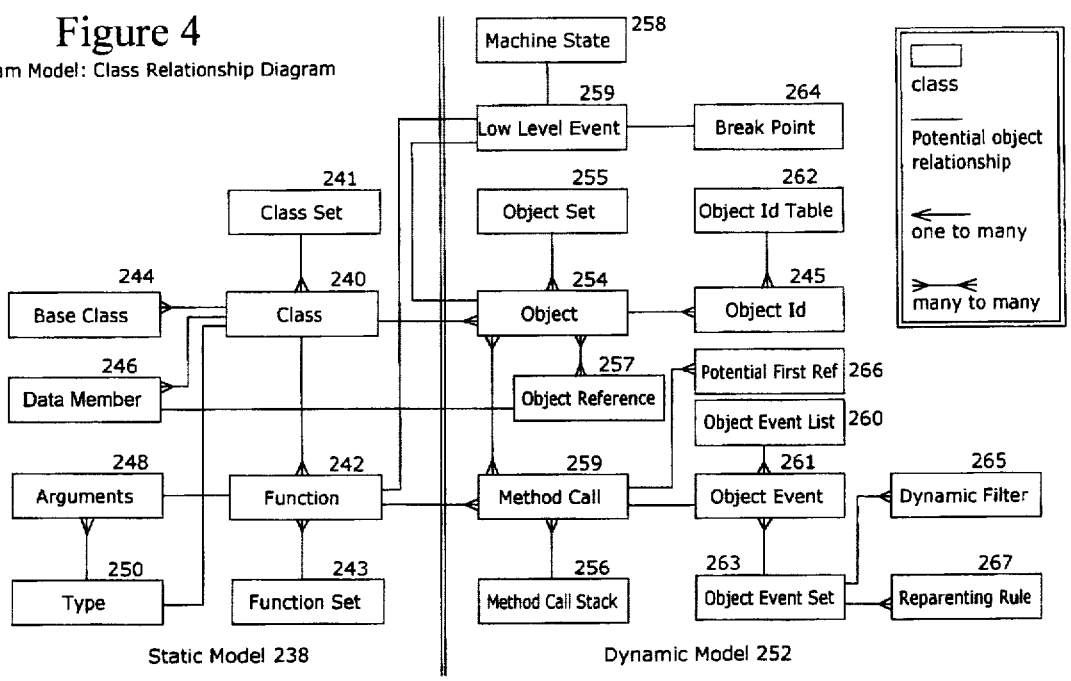
FIG. 4 is a class relationship diagram for the internal program model used by the illustrated embodiment of invention.

The illustrated embodiment uses an internal model of both the static structure and dynamic state of the monitored program to interpret a stream of machine-level events into a stream of object-level events. This model is itself object-oriented, and its classes and relationships are shown in FIG. 4, elements 238–267.

The parts of the internal program model which model the static structure of the program are created by reformatting the traditional debugging information. As the program executes this is supplemented by objects which describe the dynamic program state.

STATIC PROGRAM MODEL

The static program model 238 consists of objects which directly represent classes 240 and class sets 241, methods (or functions) 242 and method sets 243, base classes 244, data members 246, method (or function) arguments 248, and their relationships (as represented by lines connecting objects 240–250) and types 250 in the monitored program.

DYNAMIC PROGRAM MODEL

The dynamic program model 252 tracks the objects 254 and object set 255 in existence at any time; relationships between the objects, including object references 257; all valid addresses for objects or pans of objects (aggregate or base pans of objects); the current stack 256 of method invocations 259. It also maintains objects which describe the current machine state 258 and low-level events 259 of the monitored program, and holds a list 260 of all object events 261 and object event sets 263 generated by the monitored program. Moreover, it maintains an indication of potential first references 266, dynamic filters 265 and reparenting rules 267, described in further detail below.

BREAKPOINTS

To monitor locations in a C++ object program the illustrated embodiment causes breakpoints to be inserted into the monitored program. Breakpoints are the standard mechanism used in procedural debuggers to halt program execution or to record when a particular line of the program has been executed, or function called. A breakpoint is the replacement of an actual program instruction with another instruction which causes a machine trap. Whenever a breakpoint fires the controlling program can find out only the address at which the breakpoint occurred. It must then use other information provided by the standard debugger interface to relate this address to a line and method in the source code.

CONSTRUCTOR-BASED LOADING

Constructor-based loading is a novel technique introduced herein to allow a limited number of breakpoints to be initially placed to monitor all method calls.

If a class has a constructor method then, for any object instance of the class, the constructor is called to initialize the object before any other methods act on it. This allows breakpoints to just be placed on constructors. When a constructor is called the other methods are breakpointed. With C++ the picture is complicated because some classes may not have constructors and due to in-lining a class may generate the same constructor in multiple object modules, only some of which may be compiled with debugging information. The illustrated embodiment checks the state of the constructors for a class and if there is any doubt as to a constructor always being called then breakpoints will be put on all methods of that class. As each breakpoint is inserted into the monitored program a BreakPoint instance 264 representing the breakpoint is created and stored. This holds the method the breakpoint is inserted for, the type of breakpoint, the instruction replaced by the breakpoint instruction, and the address the breakpoint was inserted at.

Once all breakpoints have been added the program is allowed to run. Whenever a breakpoint is encountered in the program its operation stops and control passes to the monitoring program. This can then read the memory locations and registers in the monitored program.

OBJECT IDENTIFIERS

Object languages require each object to have a unique identifier. For C++ this is just the memory address of the object. However, because of the multiple inheritance mechanism of C++ each object may have several valid identifiers. The ObjectId class 245 in the illustrated embodiment is used to cope with this. An ObjectId instance is created for each valid identifier an object may have and is inserted into the ObjectIdTable 262 instance. Each ObjectId instance contains a pointer to the Object instance for the object. Look up of the table is by object identifier. Thus the table maps all the valid identifiers back to their internal Object instance. This table is used in interpreting calls and references as being to a base or aggregate part of an object must be identified as going to their containing object.

THE "THIS" POINTER

In C++ all methods are passed a hidden first parameter which is called the "this" pointer. The "this" pointer contains the identifier of the object the method is to act on. Note that if multiple inheritance is used there can be multiple addresses for the same object.

SPECIAL METHODS

In an object language special methods are used to create and destroy objects. In Smalltalk methods are called on special class objects to perform these operations. In C++ there are special types of methods called constructors and destructors.

The illustrated embodiment identifies constructors and destructors either directly from debugging information or indirectly from the method name format. Whenever a C++ object is created a constructor is invoked for the main object and also for each base object and each aggregate object. Conceptually the base constructors are invoked first gradually building up the object base-by-base. In fact the top level constructor is called first but it first invokes any base constructors. When these return the code for the main constructor is executed. This behavior applies recursively to all constructors. Whenever a C++ object is destroyed destructors are called for all base objects and aggregate objects. These are executed in exactly the opposite order to the constructors, but the calling order is the same (the destructors are called, execute, and then call the base destructors).

THE [GLOBAL] OBJECT AND CLASS

As well as supporting pure object-oriented programming, C++ also allows data and methods to exist unrelated to a class. In this way it supports the traditional procedural programming style of "C" as well as object programming. To cope with this situation the illustrated embodiment utilizes a [Global] class and a [Global] object. The names of that class and object are deliberately invalid as real C++ identifiers. This object represents the global scope of the program—all global variables and methods are deemed by the illustrated embodiment to be members of the [Global] class.

When the program first starts running the first object created is the [Global] object, which is the single instance of the [Global] class. All global methods are shown by the illustrated embodiment as acting on this object. Thus by introducing the [Global] class and object the illustrated embodiment can successfully apply its graphical notation to hybrid programs which have a procedural element.

HIGH-LEVEL OPERATION OF THE ILLUSTRATED EMBODIMENT

Figure 3:
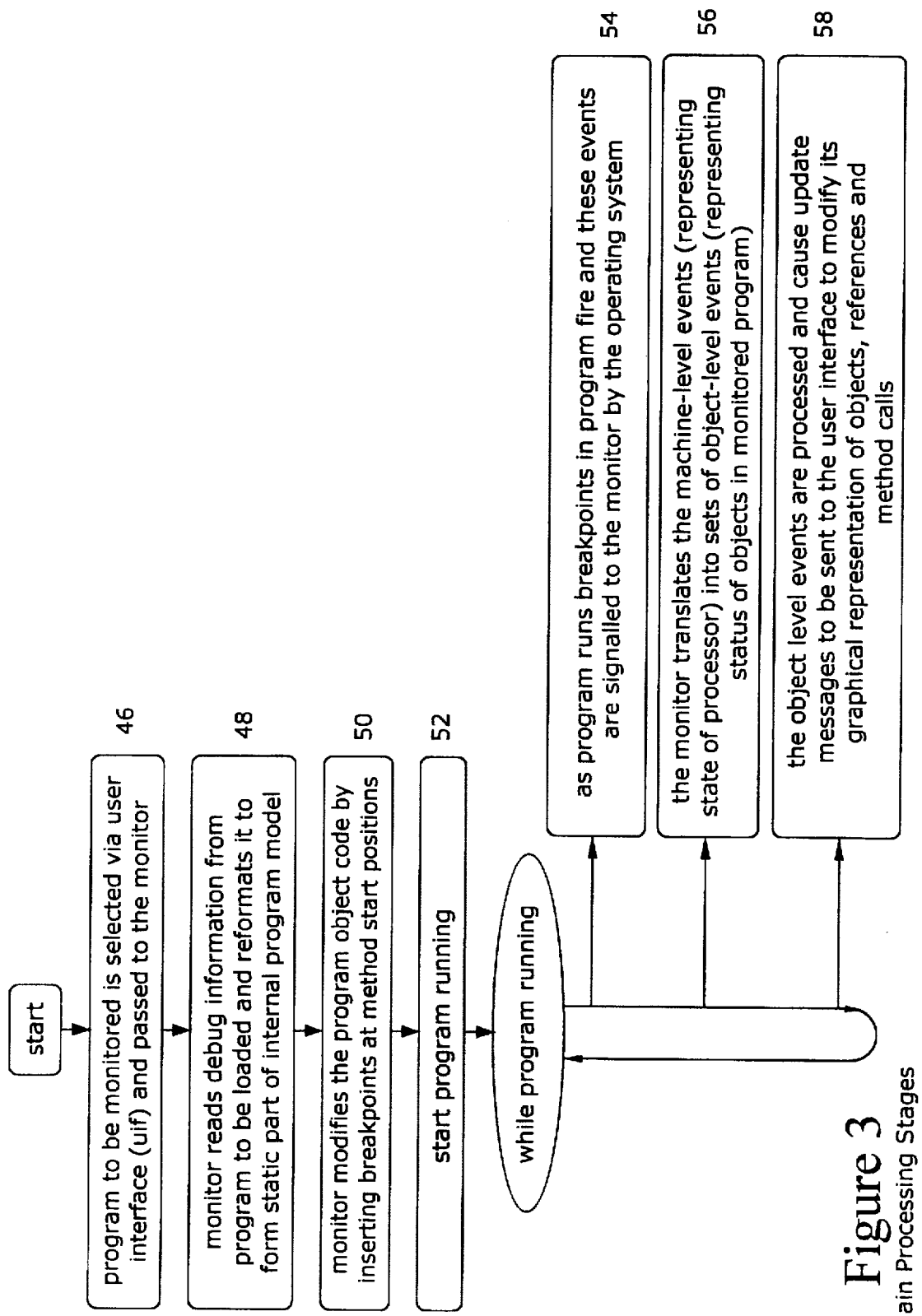
FIG. 3 is a flow diagram of high-level stages in loading and monitoring a program in the illustrated embodiment of the invention.

A high-level overview of the operation of the illustrated embodiment is outlined by the flow diagram in FIG. 3. The text in the following sections refer to that and add additional detail.

LOADING A PROGRAM FOR MONITORING

The program to be loaded is selected in the user interface and the name passed to the monitor subsystem (see step 46). The program debug information is read from the executable file into core memory and is then reformatted into the internal program model form (step 48). Debugging information generated by commercially available compilers contain sufficient information about the methods, method arguments, and types in the program to allow method calls to be monitored insofar as this information (method addresses, argument offsets) is necessary for traditional source level debugging. Most contain sufficient information about classes and class inheritance relationships to allow the full static internal model required by the illustrated embodiment to be generated. If there is insufficient information then a source code parser (not shown) can be invoked to directly extract the information from the source files.

The monitored program is then loaded into memory using the standard debugging interface available from the operating system. These interfaces allow the controlling program to be alerted as the program is about to start. At this point the illustrated embodiment calculates the start addresses of all the methods and inserts breakpoints at the start of each method (step 50). To enable more efficient loading, the illustrated embodiment uses a constructor-based approach to minimize the number of breakpoints which need to be initially set. Thus, as described above, breakpoints are preferably only inserted in method calls to object constructors.

Once the breakpoints are set the monitored program is allowed to execute (step 52). As it executes breakpoints signaling entry to or return from methods are encountered and processed (step 54) until the program completes.

METHOD EVENT PROCESSING

Irrespective of whether a method is being called or returning, there is a basic structure to processing the event: The BreakPoint object describing the machine-event is found. A LowLevelEvent instance is then created from the BreakPoint by processing the BreakPoint in the context of the program model. The LowLevelEvent is then processed into a set of ObjectEvents which are grouped by an ObjectEventsSet instance (step 56). The ObjectEventSet instance is then analyzed to produce a set of messages which are sent to update the user interface subsystem (step 58). These messages are sent as a single operation. The monitor then waits for a continue message from the user interface. When this is sent the monitor deletes transient instances created during processing, such as the LowLevelEvent instance and the ObjectEventSet instance, and allows control to pass back to the monitored program which then continues execution.

CREATING A LOW-LEVEL EVENT

Figure 5:
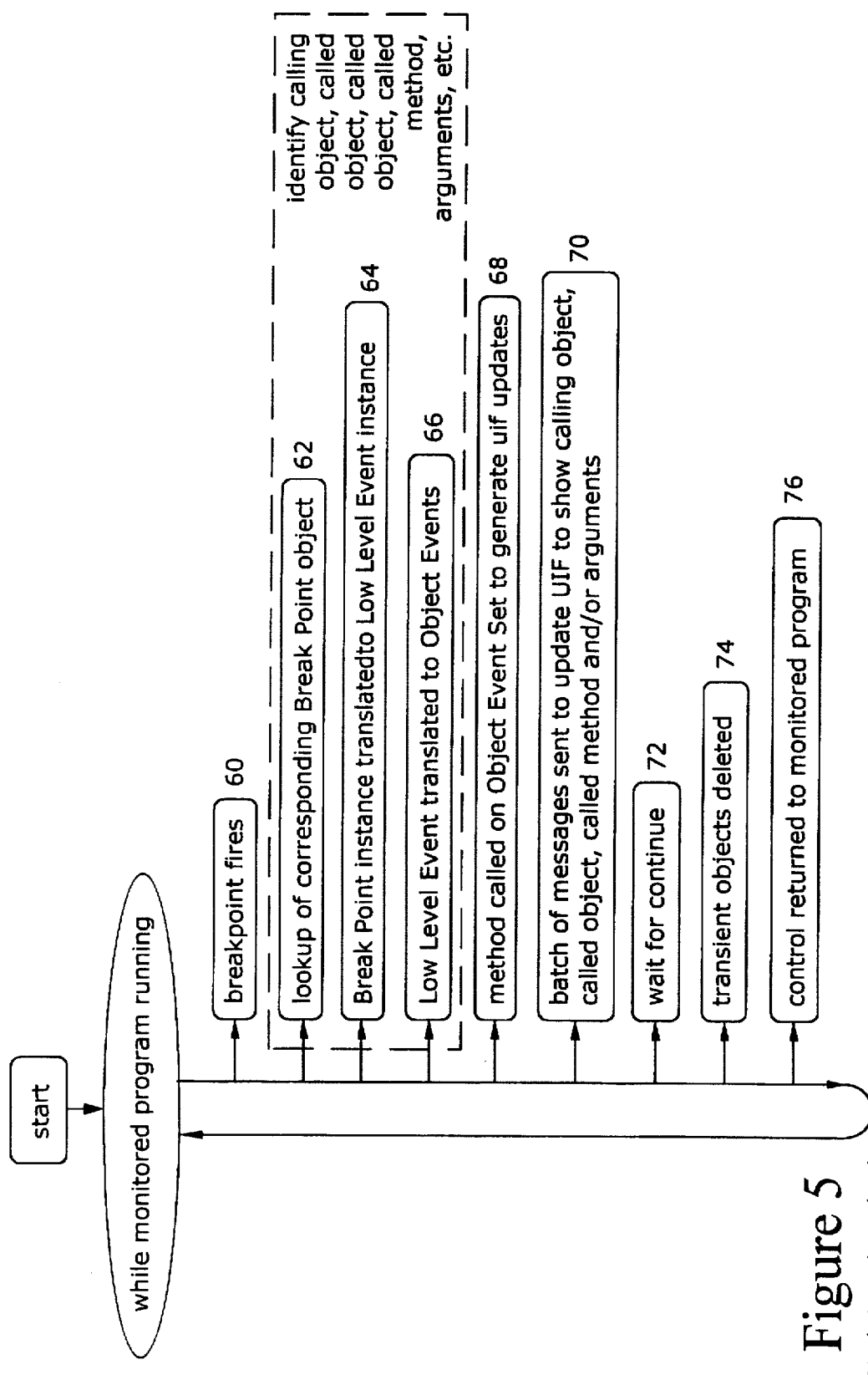
FIG. 5 is a high-level flow diagram of the processing of a method call or return event by the illustrated embodiment of invention.

Referring to FIG. 5, when a breakpoint fires (step 60) a lookup is done against the BreakPointSet instance (step 62).

This returns the internal BreakPoint instance that describes the breakpoint. Each BreakPoint instance stores the Method instance corresponding to the method it has been inserted into, and stores whether it is a call, return, or write breakpoint. Each Method instance is marked as representing a constructor, destructor, or ordinary method. Each Method instance also stores a reference to the Class instance of which it is a member. The value of the "this" pointer for the method is accessed using by calling the first Argument instance with the address of the current machine call frame. The "this" Argument instance accesses and returns its value. This value is the identifier of the object the call is acting on.

The Method instance, method type, Object instance, and event type are used to create and initialize the appropriate type of LowLevelEvent instance (step 64)—method call, constructor call, destructor call, method return, constructor return, destructor return—which then processes itself to complete the processing of the machine event. The Low-LevelEvent object processes itself in the context of the program model, which includes the current MachineState instance. The MachineState instance provides an interface to read and modify registers and memory in the monitored program.

Note that the low-level mechanism for setting and interpreting breakpoints is a separable part of the monitor subsystem. It is one mechanism for initializing LowLevelEvent instances, which can, for example, be initialized from the message-passing mechanism of a wholly dynamic object-oriented language.

METHOD CALL EVENT PROCESSING

As illustrated in FIGS. 5 et seq., some standard processing is done for all method entry events, irrespective of whether they are for a constructor, destructor, or ordinary method. This processing is first described, then the special features for constructors and destructors are described:

A new ObjectEventSet instance is created to hold the object events derived from processing this low-level event (see steps 66, 78, 98 and 114). An ObjectCallEvent instance is created (step 80) to identify the calling object, a called object, a called method and arguments with which the call is made. More particularly, this stores the calling Object instance, the called Object instance, and the Method instance of the call. The calling Object instance is derived from the top level of the MethodCallStack. It also creates and stores the values of all Argument instances. The ObjectCallEvent is added into the ObjectEventSet instance (step 82) and to the ObjectEventList which records the sequence of all object events. A MethodCall instance is created (step 84). This references the ObjectCallEvent and also stores current stack frame details accessed through the MachineState instance. It also acts as a holder for top level destructor identifiers and potential reference events. ObjectReferenceEvent processing is initialized for this method (step 86) according to the type of reference checking currently applied.

The MethodCall instance is pushed onto the MethodCall instance stack. The ObjectEventSet then processes itself to determine if the events should be sent to the user interface (step 68)—that is, to determine whether the display should be updated to reflect changes in any of the calling object, called object, called method and arguments. This is decided in the context of the current Filter Instance. If the events are sent (see steps 70, 96, 112, and 128) then the monitor waits for control to return from the user interface subsystem (step 72) and then returns control to the monitored program, transient objects are deleted (step 74) allowing it to continue execution (step 76).

CONSTRUCTOR CALL EVENT PROCESSING

Figure 6:
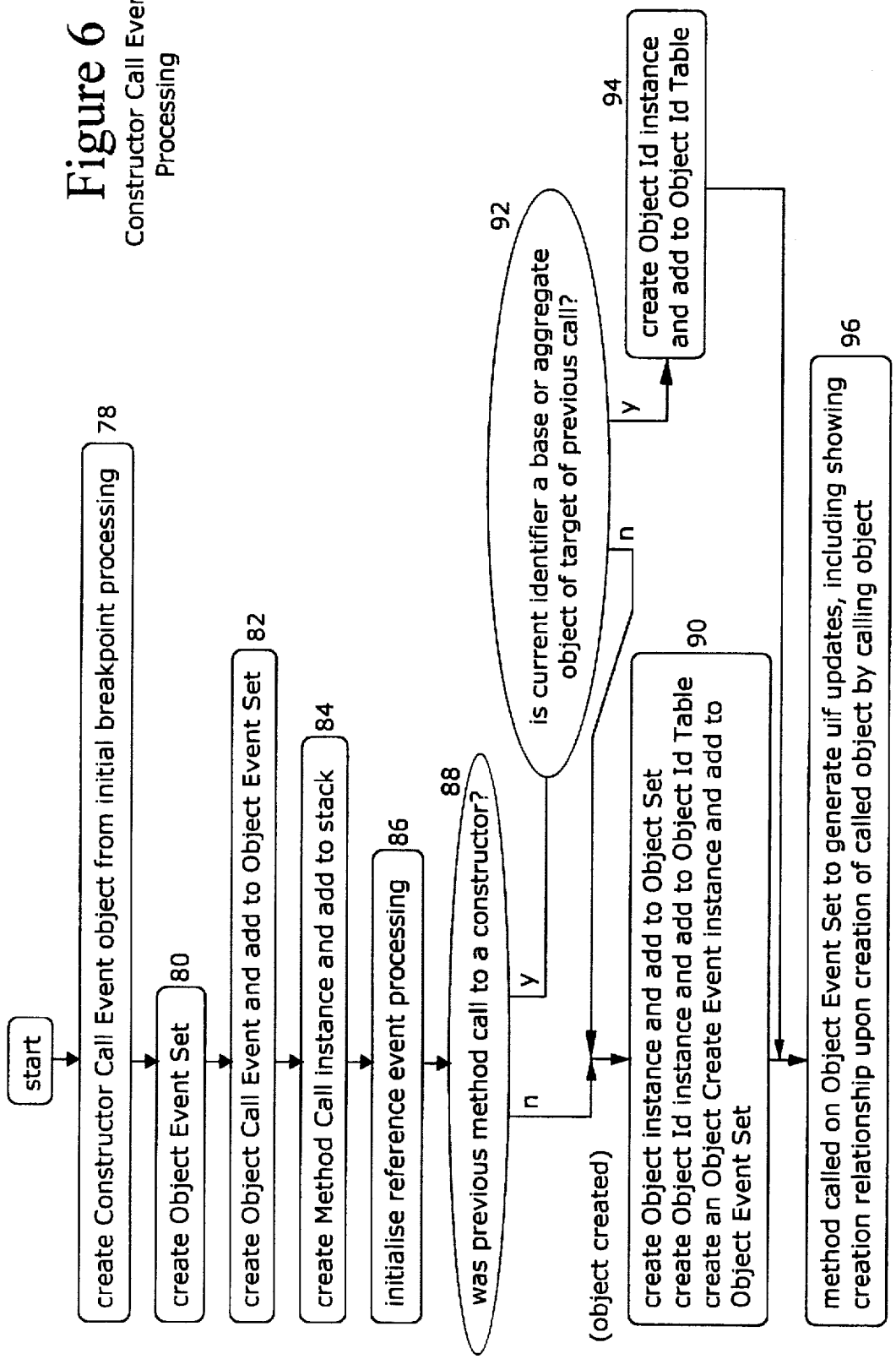
FIG. 6 is a flow diagram describing Constructor Call Event processing by the illustrated embodiment of invention.

If the method is a constructor the illustrated embodiment must determine if a new object is being created, or if a base or aggregate constructor is being invoked to complete the initialization of an object which has already been created. ConstructorCallEvent processing is illustrated in FIG. 6.

To do this the MessageStack object is called (step 88). It checks object information for the top element. If the method in the top MethodCall is not a constructor then a new object is being created (step 90). If the top method is a constructor but the called Object instance in the top MethodCall instance does not have the object as a base or aggregate (step 92) then a new object is being created, and an Object Instance is created to represent it. Otherwise this constructor is initializing a base object or aggregate object of an existing object. An ObjectId instance for the main object to the base or aggregate component is always added to the ObjectIdTable instance when a constructor is called (step 94). The ObjectId instances enable the main object to be identified even if a base identifier is used.

ORDINARY METHOD CALL EVENT PROCESSING

If the method is not a constructor then the ObjectIdTable is called to find the object with that identifier. If no object is matched then either the class has no constructor or the value is invalid (a programming error). The class is checked to see if it has valid constructors. If it does then an ErrorEvent instance is created, and the Object instance the Method instance is being applied to is set to the [Global] instance to allow execution to continue.

If the class does not have constructors then a WarningEvent instance is created that the class does not have a valid constructor and a new Object instance is created with the current identifier, together with an ObjectId object.

DESTRUCTOR CALL EVENT PROCESSING

Figure 7:
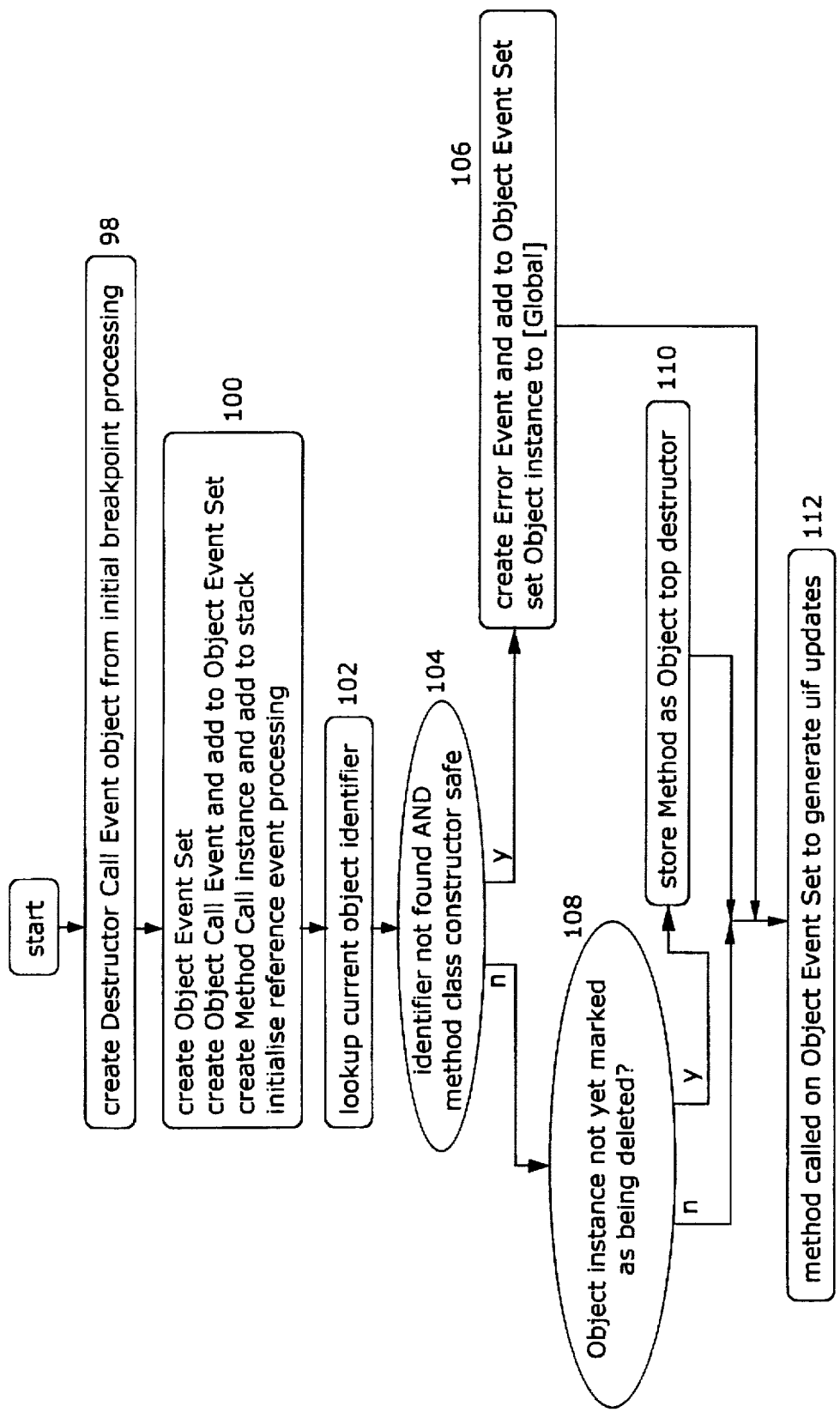
FIG. 7 is a flow diagram describing Destructor Call Event processing by the illustrated embodiment of invention.

DestructorCallEvent processing is illustrated in FIG. 7. As previously discussed, initial processing is performed to create an OBJECTEVENTSET instance and to add the Object Call Event to the set instances. If the method is not a is performed to create an OjectEventSet instance and to add the Object Call Event to the set instance. A method Call instance is created and added to the stack and initialization is performed as set forth in step 100. If the method is not a constructor then the ObjectIdTable instance is called to find the Object instance for that identifier (see steps 102 and 118). If no Object is matched then either the class has no constructor or the value is invalid (a programming error). The Class instance is checked to see if it has valid constructors (steps 104 and 120). If it does then an ErrorEvent instance is created (step 106), and the Object instance to which the Method instance is being applied is set to the [Global] instance to allow execution to continue (steps 106 and 122).

If a destructor has been called then it is either the first destructor to be called on an object, in which case an ObjectDeleteEvent instance is created when it returns, or it is a base object or aggregate object destructor. If an object is being destroyed then its Object instance is marked as such and the Method instance for the first destructor to act on it stored in its Object instance. If the Object instance is not marked as currently being deleted (step 108) then this is the first destructor and a reference to its Method instance is stored in the Object instance (step 110). If the Object instance is already marked as being destroyed then only an ObjectCallEvent instance is created as normal.

METHOD RETURN EVENT PROCESSING

Figure 8:
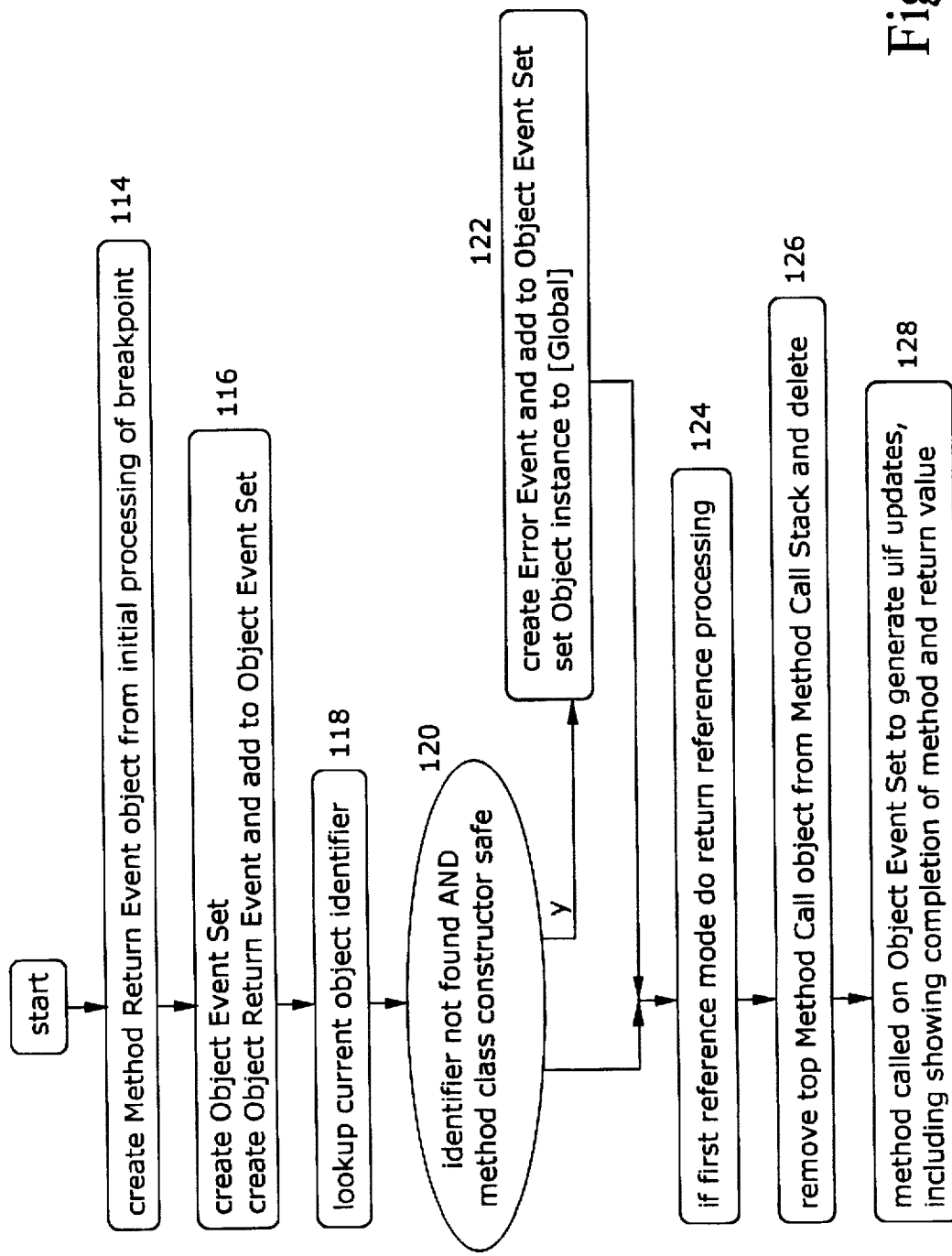
FIG. 8 is a flow diagram describing Method Return Event processing by the illustrated embodiment of invention.

Some standard processing is done for all method return events, irrespective of whether they are for a constructor, destructor, or ordinary method. This processing is first described below, then the special features for destructors are described. MethodReturnEvent processing is illustrated in FIG. 8.

An ObjectEventSet instance is first created. An ObjectReturnEvent instance is created and added to the ObjectsEventsList instance (step 116). This event accesses and stores the return value of the method, accessing the MachineState instance to read its value from the monitored program. If first-reference relationship processing is selected then the top MethodCall instance is called to check if any ObjectReference instances are to be created (step 124). The top MethodCall object is removed from the MethodCallStack (step 126) and deleted.

DESTRUCTOR RETURN EVENT PROCESSING

Figure 9:
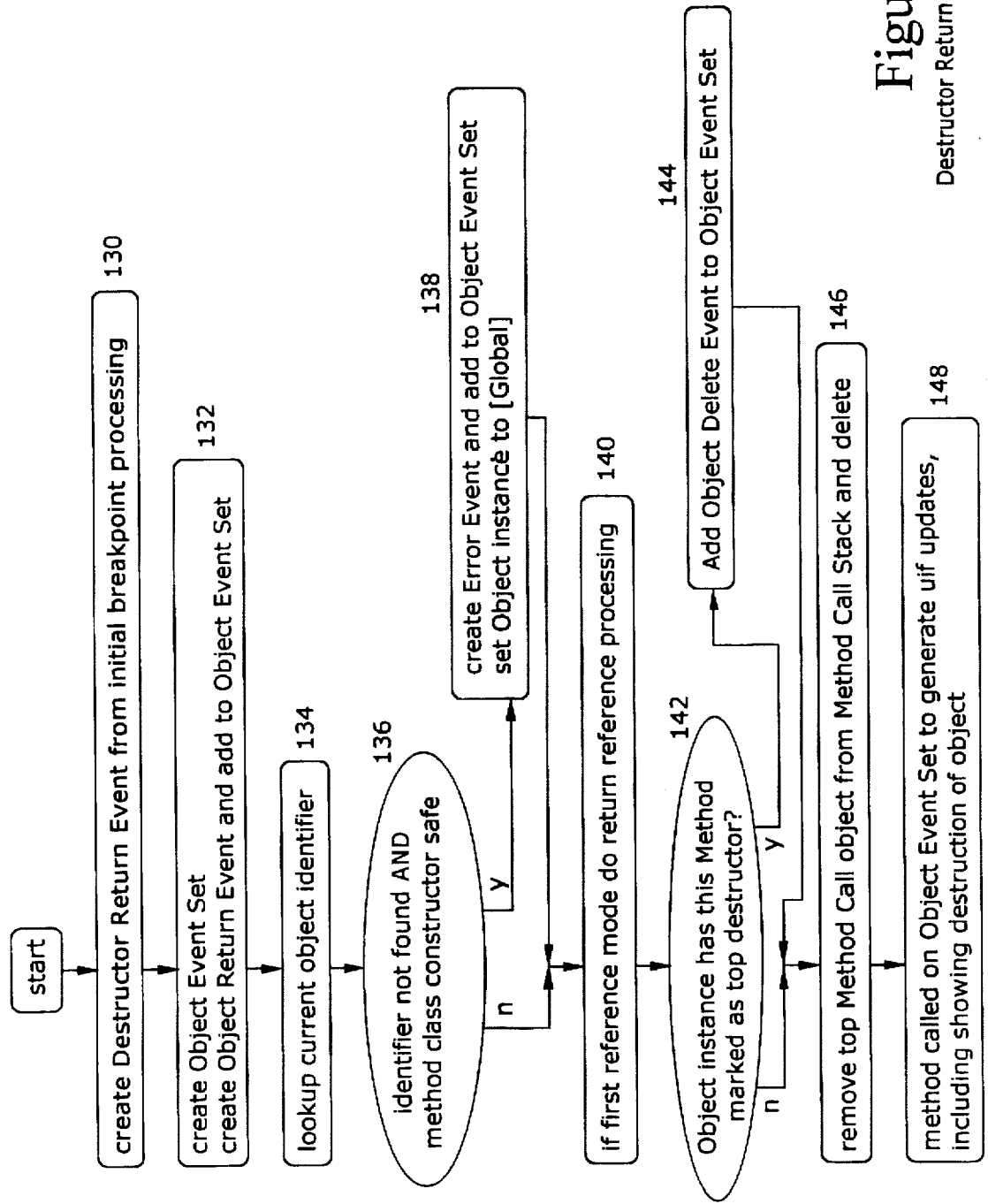
FIG. 9 is a flow diagram describing Destructor Return-Event processing by the illustrated embodiment of invention.

Destructor return processing is handled as illustrated in steps 130-148 of FIG. 9. If the return is from a destructor and the Object instance the destructor is acting on has this destructor marked as its top level destructor then an ObjectDeleteEvent instance is created as well as the ObjectCallEvent instance.

OBJECT RELATIONSHIP PROCESSING

A reference relationship between two objects exists if one object has a data member which is an identifier for another object. In C++ terms this means that the object holds a valid pointer or reference to another object instance. However an object may be created with only a local variable holding its identifier. To allow objects to be positioned before their identifiers have been stored in other objects, or if they are never stored, the default relationship of has_created is used.

OBJECT HAS_CREATED RELATIONSHIPS

Each object is created by another object. If the creating method is not a member of a class then the creator is shown as being the [Global] object. Thus creation is a tree-shaped relationship (each object has one creator and can create many objects). Each object is initially shown parented below its creator object.

OBJECT REFERENCE RELATIONSHIPS

Figure 16:
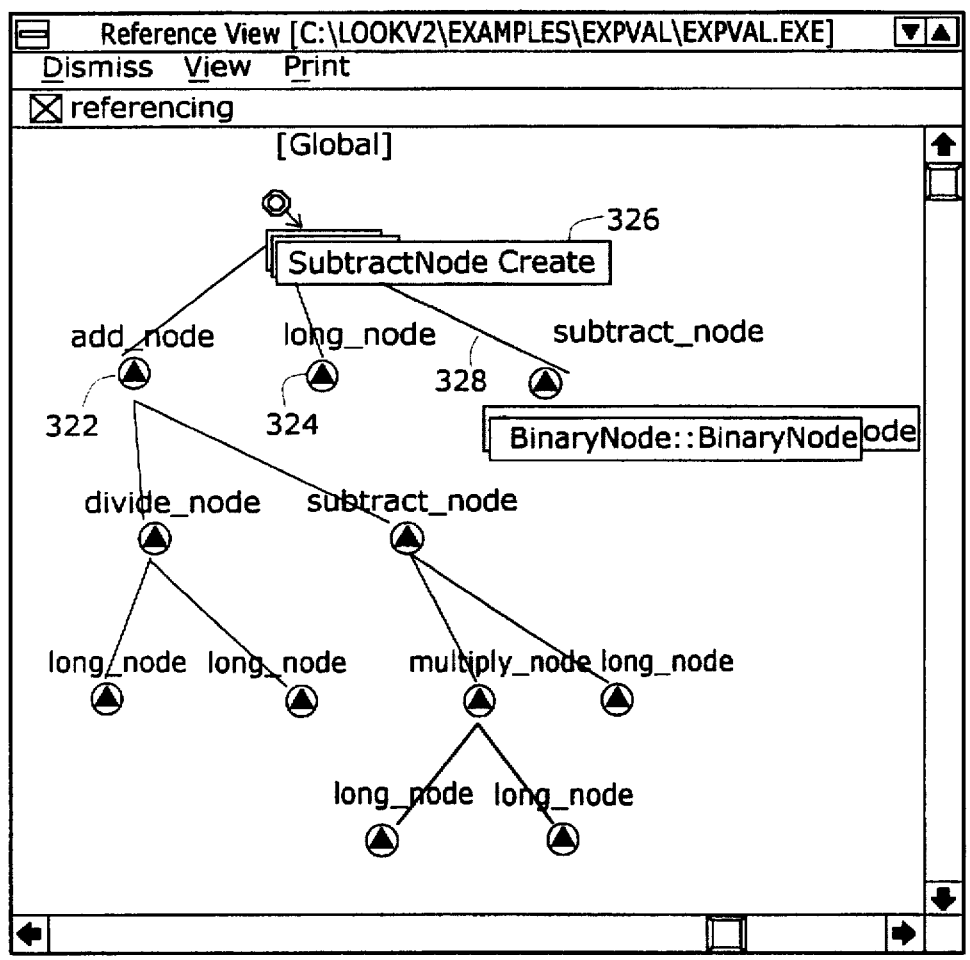
FIG. 16 is an illustration of a display created by an embodiment of invention showing a binary tree just before a re-parenting operation

The creation relationship is only the default relationship. If data relationships can be used to structure the positioning of the object icons then the shapes of standard data structures such as trees and lists form naturally on the screen as the objects store references to one another. FIG. 16 shows how the illustrated embodiment represents a tree structure.

Thus, an object icon is initially displayed in a reference view with a has_created relationship from its parent to it. When the illustrated embodiment detects the subsequent formation of a reference relationship between another object and that object then the illustrated embodiment will re-parent the object icon—making it a child icon of the icon which now refers to it.

There are two phases to object reference relationship processing—it is initiated for each method call being processed and then further processing depends on whether first reference or full reference processing is being used. If first reference processing is being used the second stage of processing is invoked as methods return. If full reference processing is being used the second stage of processing occurs as MemoryWrite breakpoints fire.

OBJECT REFERENCE DETECTION

The illustrated embodiment supports two ways of detecting reference formation. The first only detects a limited number of references and its main application is to achieve a satisfactory layout of the objects on screen. It imposes little overhead, and can be effective for programs which build up a data model initially and then use it with little change. The second mechanism allows general reference detection, is less dependent on the object-oriented style of programming being followed, but is more machine dependent, and imposes a larger runtime overhead.

FIRST REFERENCE DETECTION

If first reference detection is used then objects are laid out according to the formation of the first reference to each object in another object. If the reference subsequently changes then the layout is not changed.

If the object model is strictly followed in a C++ program then no public data members, and no external pointers to private or protected members are used. If these conditions hold then an object which forms the first reference to another object must get the identifier of the object passed as an argument. It may be thought that the identifier may be returned from a call to an object, but in this case the identifier must already exist within the called object and so this object would already have formed a first reference to the object whose identity has been passed as an argument. Thus by checking only arguments the flow of first references in an object program can be monitored.

Figure 10:
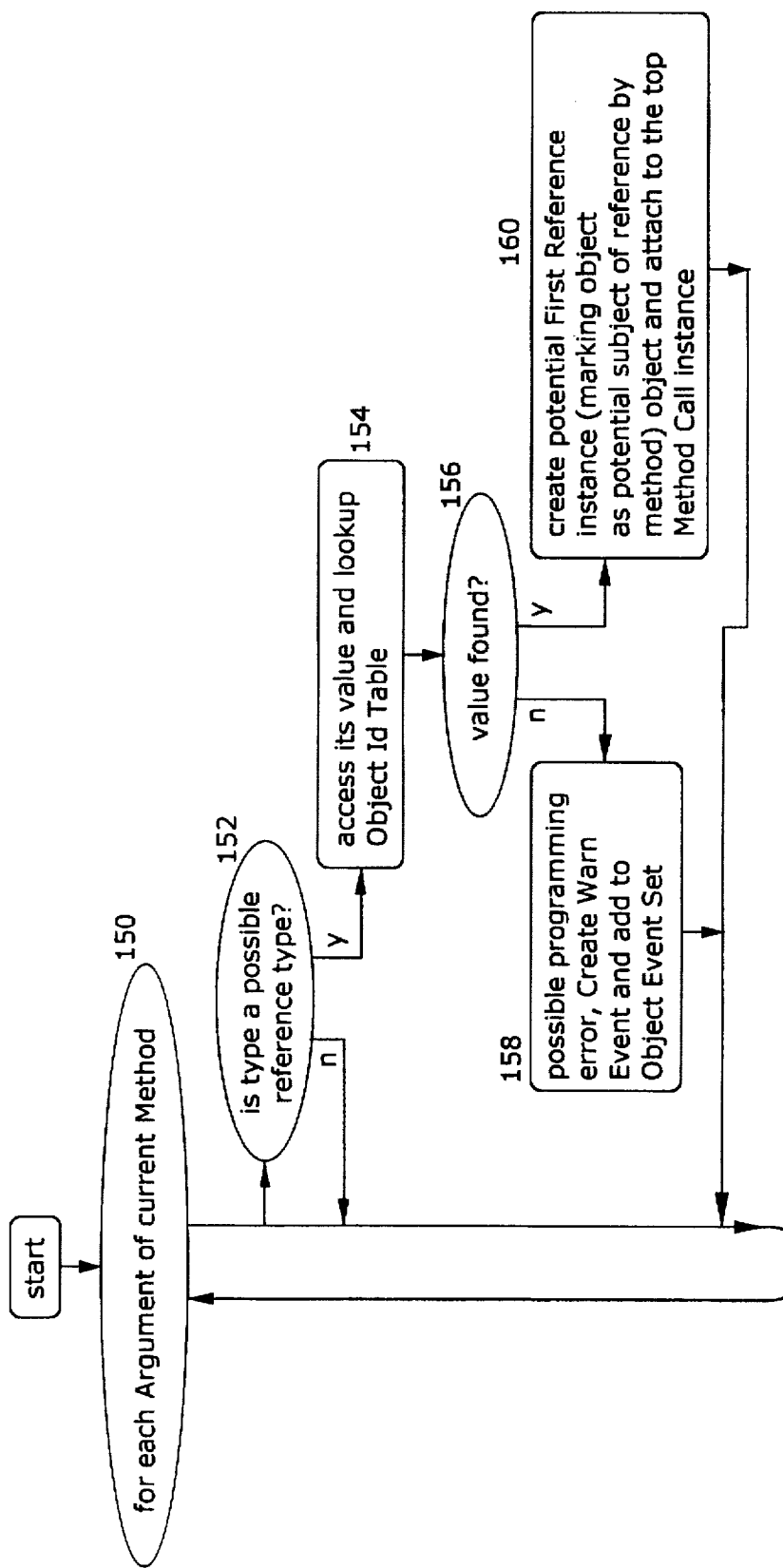
FIG. 10 is a flow diagram describing the initial processing for first-reference reference detection by the illustrated embodiment of invention.

Steps 150-160 of FIG. 10 show the initial processing for first-reference detection. When a method is called its arguments are checked to see if they are valid object identifiers by type examination and look up in the ObjectIdTable. For each valid Object instance accessed a check is made if it already has a first reference. If it doesn't a PotentialFirstRef instance is created to hold the Argument instance, value, and Object instance. This is then stored by attaching it to the new MethodCall instance.

Figure 11:
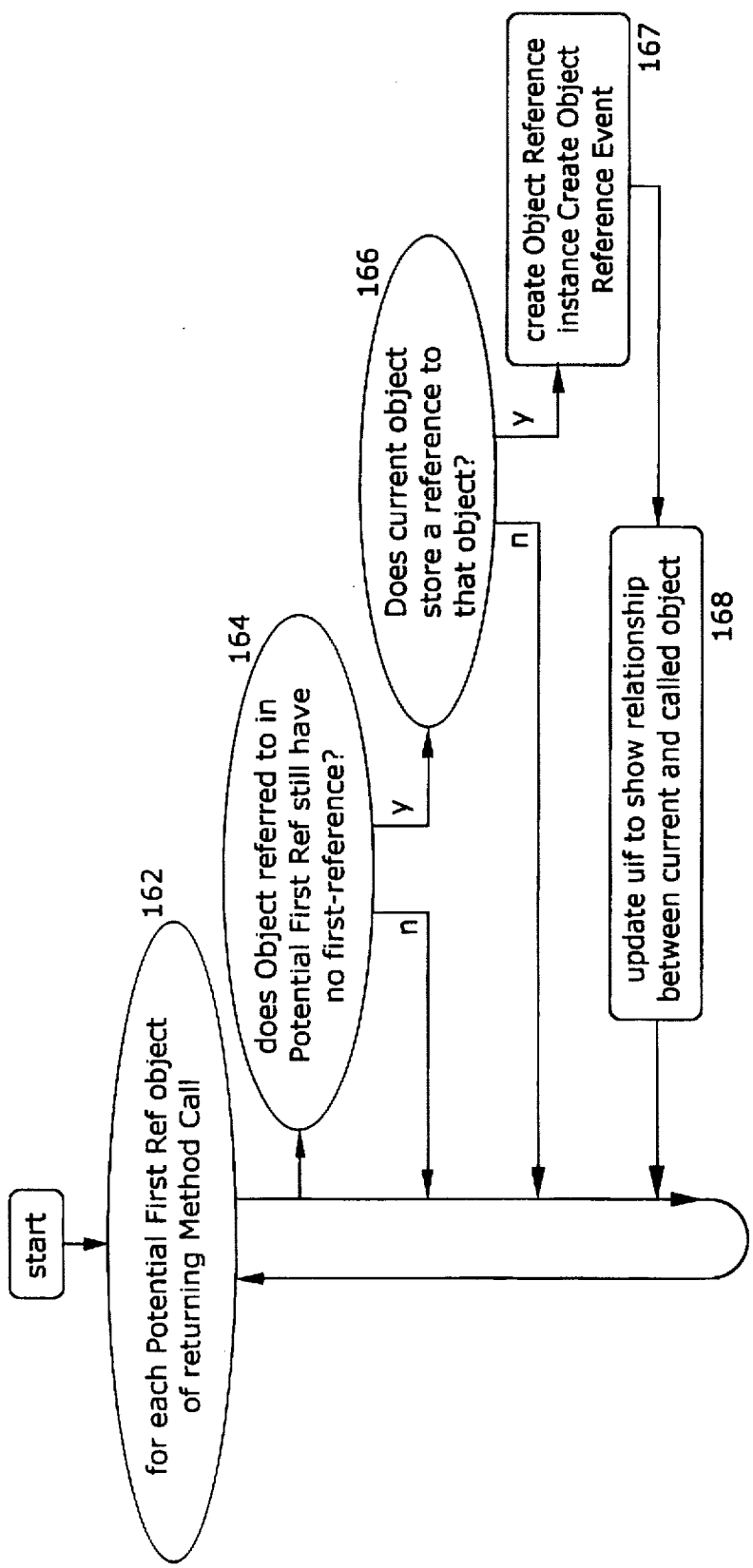
FIG. 11 is a flow diagram describing the secondary processing necessary for first-reference reference detection by the illustrated embodiment of invention.

When that method returns the set of PotentialFirstRef instances held by the MethodCall instance are checked, as shown in steps 160-168 of FIG. 11. The Object instance referred to is checked to see if it now has a first reference. If it doesn't then the members of the current object are checked to determine if any now store the candidate reference. If they do then a ObjectReference instance is created to record the first reference. It records the objects involved and the DataMember instance for the member which holds the reference.

FULL REFERENCE DETECTION

The second approach is more complete, allowing the detection of the formation of all references in any monitored method if the object model is followed, and with the capacity to cope with the departures from the object model which may appear in a C++ program. The basic approach is to disassemble the machine instructions for each method the first time it is called and insert breakpoints on all write instructions in the method. As a write breakpoint fires the target of the write is analyzed and any that could not be to an object data member that holds an object reference are removed. In this way the set of write breakpoints gradually converges on the set necessary to monitor changes in object references. The value to be written is also constructed by accessing data from the monitored program. This value is looked up in the ObjectIdTable to identify if a reference is being written, and of which object.

Figure 12:
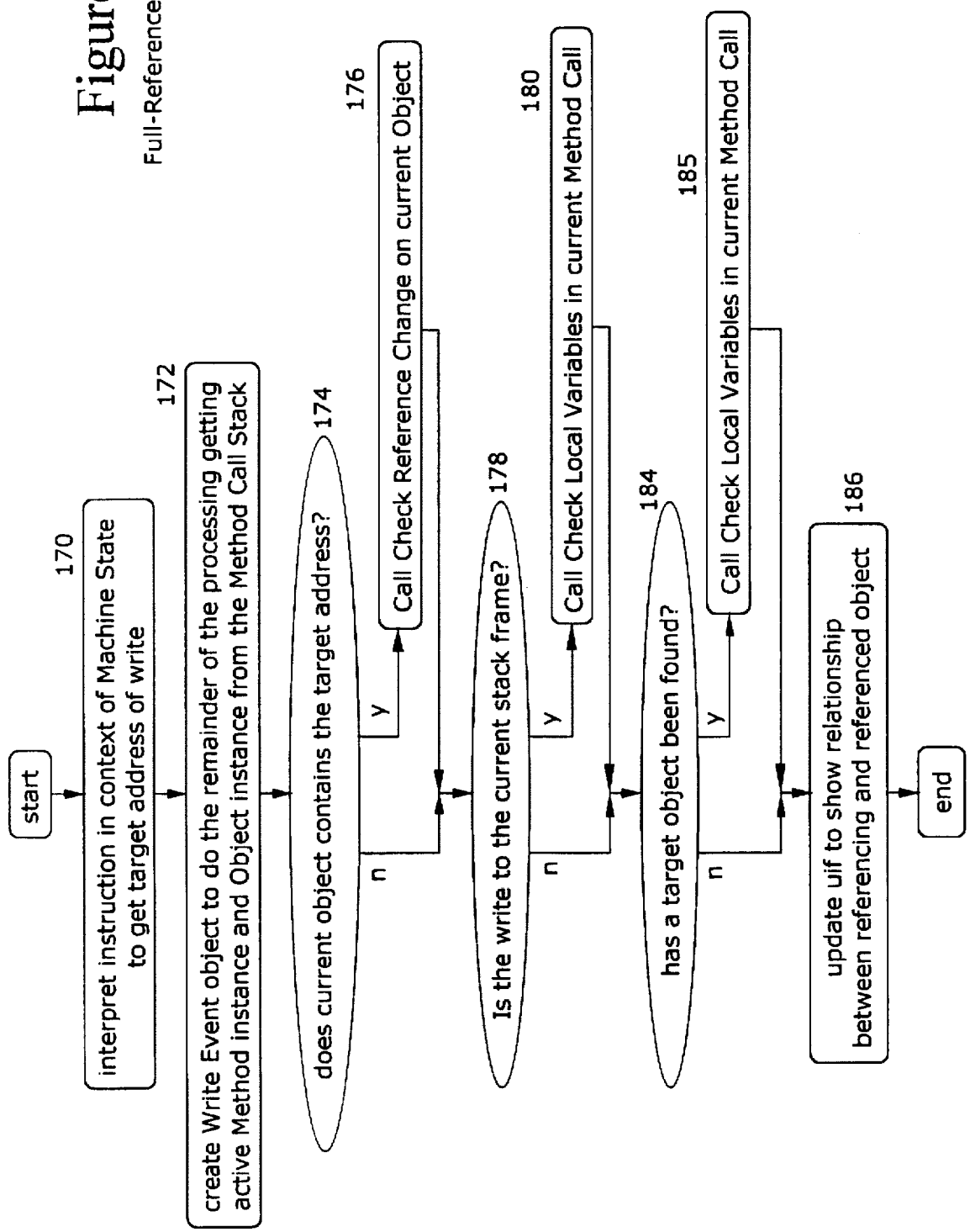
FIG. 12 is a flow diagram for full-reference detection in the illustrated embodiment of invention.

A flow diagram for full reference detection processing is given in steps 170–186 of FIG. 12. The first stage is to match the target address to a known object. The order of search for the target object is important to allow this operation to be completed quickly. The search is optimized for a program which uses the object model.

Figure 15:
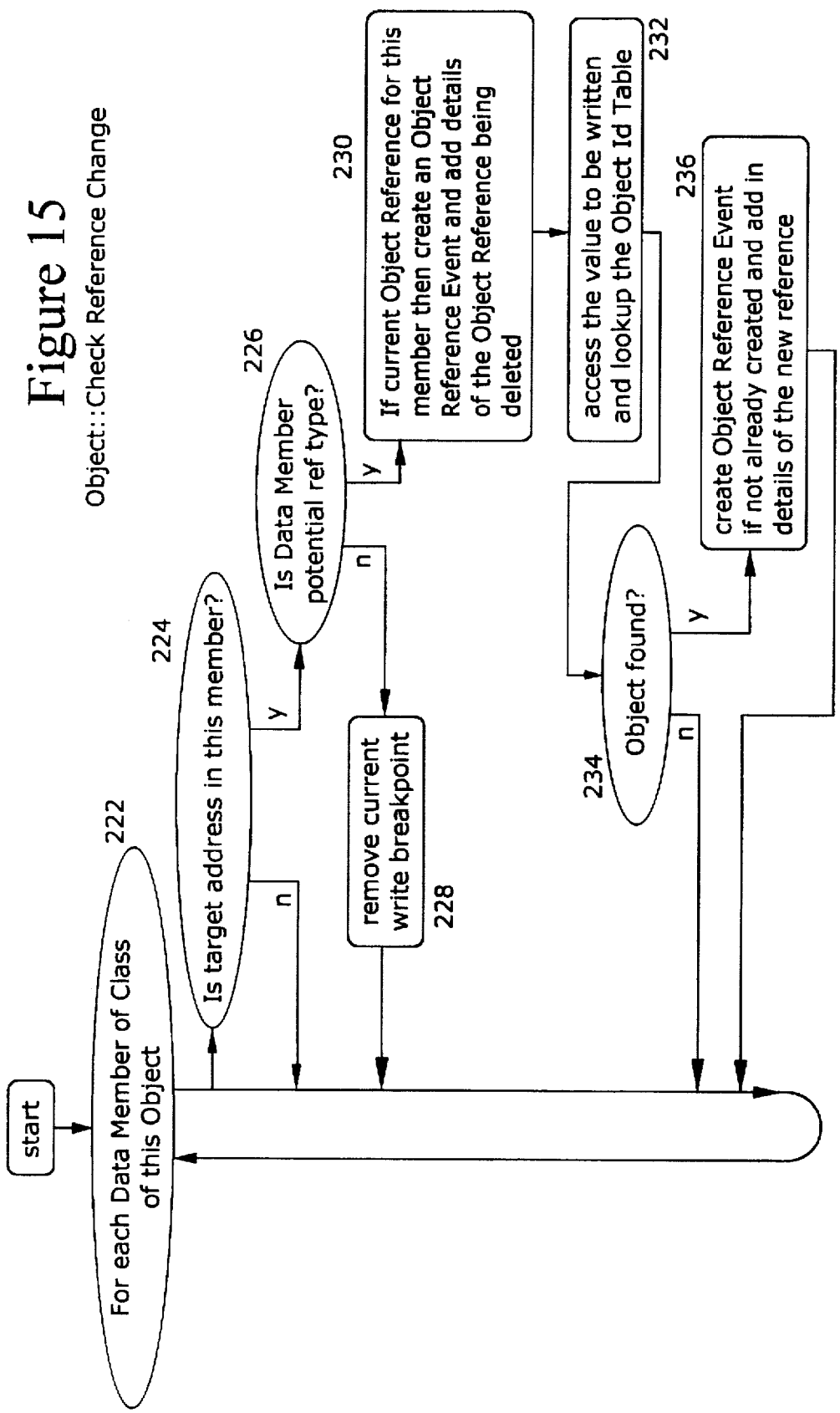
FIG. 15 is a flow diagram for the Object::CheckReferenceChange method used in full-reference detection by the illustrated embodiment of invention.

The address is first checked to see if it is inside the current object. If it is then the CheckReferenceChange method is called on the current Object instance. A flow diagram of CheckReferenceChange is shown in FIG. 15, steps 222–236.

If the address is not in the current object and if the object model is being strictly followed then the write cannot be to create an inter-object reference as all writes to an object should be within the context of a method. However some popular class libraries feature very limited use of public member data in classes such as list items, presumably for increased efficiency. To cope with this some additional checking is necessary, as described below:

As most writes are to local variables the target address is checked to determine is it is in the current stack frame. If it is then the local variables which are in scope are checked to find the target variable. If this is an object then CheckReferenceChange is called on that object. If it is not then the MemoryWrite breakpoint is removed, as that instruction will never write to an object. If it is not on the stack then the illustrated embodiment uses a one-stage "look-ahead" search. It assumes that what is happening is that a data member in the current object is being publicly de-referenced. That is, the illustrated embodiment assumes that a public data member of an object referenced from this object is being written to. Each Object instance referenced from this Object instance is checked for the target address. For each one the CheckReferenceChange is called. If a target object reference is not found then the breakpoint is removed.

Figure 13:
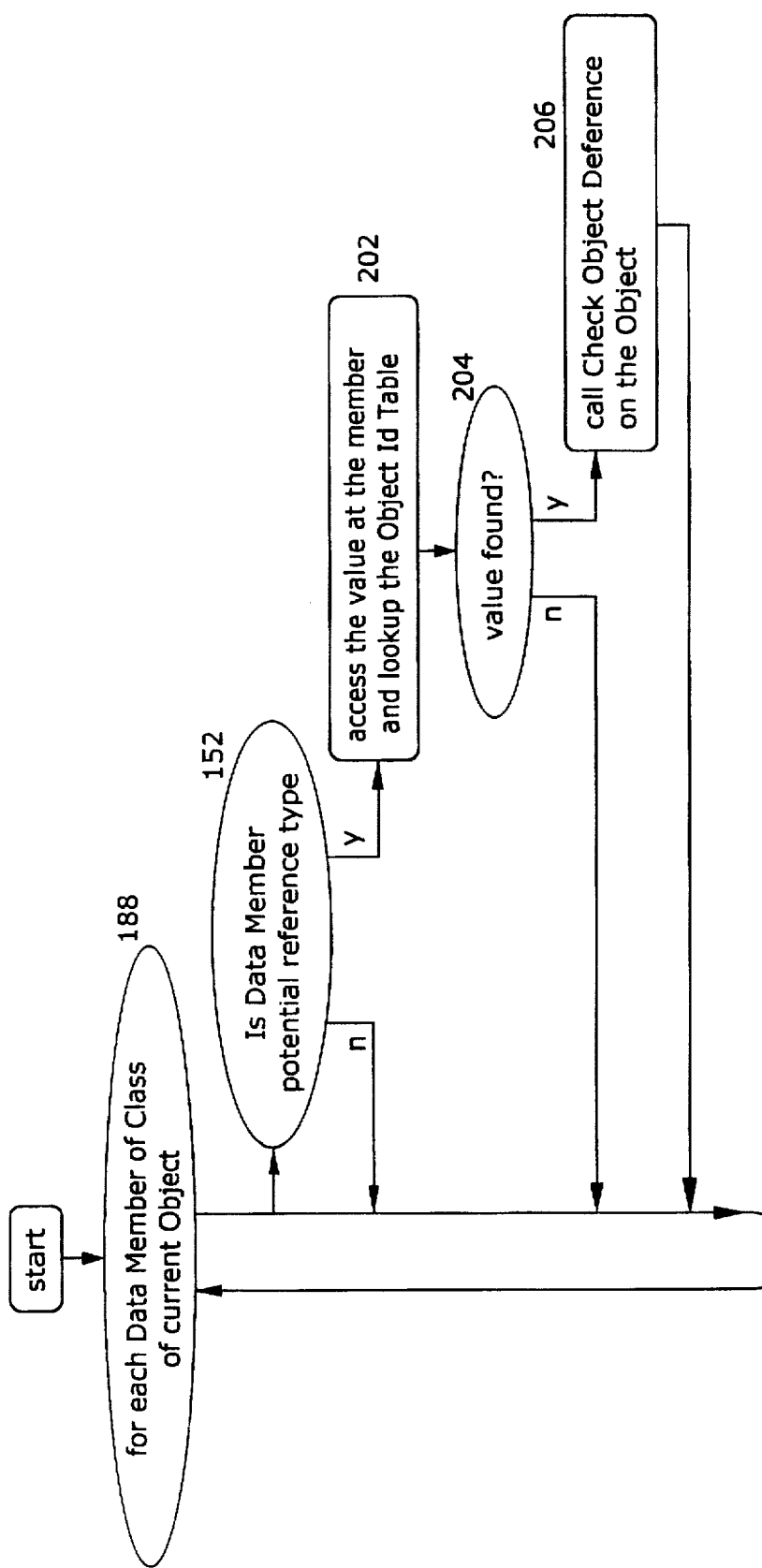
FIG. 13 is a flow diagram for Object::OneLevelDereferenceCheck method used in full-reference detection by the illustrated embodiment of invention.
Figure 14:
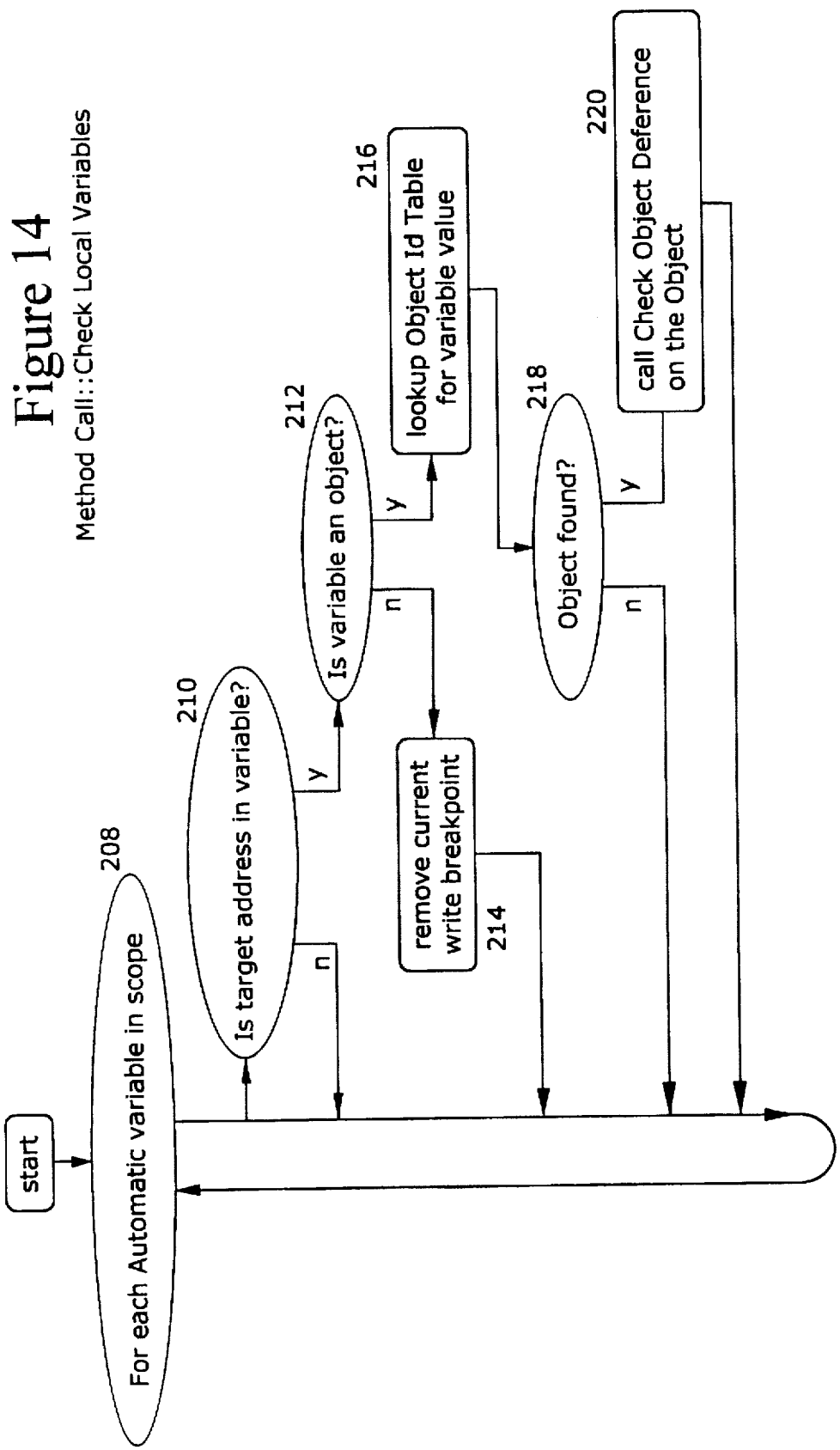
FIG. 14 is a flow diagram for the MethodCall::CheckLocalVariables method used in full-reference detection by the illustrated embodiment of invention.

A flow chart for the One Level Deference Check Procedure referred to, e.g., in step 182 of FIG. 12, is illustrated in FIG. 13, steps 188–206. Likewise, a flowchart for the CheckLocalVariables referred to, e.g., in step 180 of FIG. 12, is illustrated in FIG. 14, steps 208–220. CHECK_REFERENCE_CHANGE METHOD The CheckReferenceChange method, which is illustrated in FIG. 15, steps 222–236, acts on an Object instance to determine if a reference change is occurring in the monitored program. It first finds the object data member at the target address by scanning the DataMember instances for the current Object instance (including base objects). The type of the DataMember instance is checked to see if it could hold a reference to another object. If it could not then the MemoryWrite breakpoint is removed to prevent further unnecessary checking. If it could then the value to be written is calculated and this is used to look up the ObjectIdTable. If an object is found then an ObjectReference instance is created for the new relationship. An ObjectReferenceEvent instance is created, and the new ObjectReference instance linked to it. A check is made to find an existing ObjectReference instance for the selected DataMember instance. If one is found then this write will invalidate it. If an ObjectReferenceEvent has not been previously created by the method then it is created at this point. If one already exists then it is used. The ObjectReference instance which is being deleted is attached to it. Thus the ObjectReferenceEvent class can describe the formation of a new reference, or the deletion of an old one, or both simultaneously as a reference is overwritten with another reference.

TARGET ADDRESS SEARCH STRATEGIES

The strategy above is used because it has proven to work well, but alternative search strategies can easily be substituted. The one stage look-ahead can be removed to implement a strategy for pure object programming. Alternatively, more exhaustive strategies could be substituted for programs that have less object structure: If a target object is not found with a one-level "look-ahead" a two or even three level look-ahead could be used: few programs feature pointer chains greater than length three. As well as using a look-ahead from the current member-variables, a look-ahead from the current local variables which contain valid object identifiers could be used. To do a complete search of all current objects is possible, as all are contained in the ObjectSet instance. The key point is that the object could always be found, but that performance is greatly improved by making assumptions about program form and directing the search.

DYNAMIC ARRAYS IN C++

Dynamic arrays in C++ can be problematic as they are usually coded as unstructured memory arrays referenced from a holder object. This type of data format appears typically in hash table classes and dynamic array classes in C++. If the array holds references then these occur in memory which is outside the bounds of the object. The illustrated embodiment requires these classes to be manually identified together with the data member which points to the area of unstructured store, the data member which keeps track of the number of elements in the array or the array size, and the element size.

This additional knowledge about the class must be entered manually, but can be pre-prepared for popular class libraries. One of the advantages of object technology is the enhanced opportunity to reuse software. The result is that few C++ programmers now re-invent the basic container classes—lists, trees, arrays, etc. which structure C++ programs. There are only a relatively small number of popular class libraries, and a very small number of dynamic array based classes in each. So the preparation of the information to allow tracking of dynamically allocated array based classes is small.

PROCESSING OBJECT REFERENCE CHANGE EVENTS

ObjectReferenceEvents form part of the current ObjectEventSet and are added to the ObjectEventList. When the ObjectEventSet is processed they may cause relationship update and re-parent messages to be sent to the user interface. Whether first-reference or full-reference processing is being done the user interface depicts the program objects using a tree structure. To achieve this a selected set of object references act as parent_references. The parent_reference is first of all to the creator object (the has-created relationship). This is then replaced by the first reference that is formed to an object, providing the referring object is not already a child of the current object, in order to prevent a circular relationship being formed. Similarly, further reference changes, only cause references to become parent_references if they would not cause circular relationships. Other rules are applied to decide when re-parenting should take place. Each rule is a separate instance in the program model. The set of rules can be modified to make re-parenting behavior more or less conservative, showing many reference changes, or trying to maintain the existing ones as long as possible. The following rules are currently applied:

If a parent_reference value in a parent object is overwritten then the reference no longer exists and re-parenting of the child object must take place. If the object has no other existing references suitable to be its new parent_reference then it is simply reparented to the [Global] object with a special NoReference reference. If the object is currently structured by a has_created relationship, then re-parenting will take place. If a reference is formed to an object which has a NoReference parent relationship then it will be reparented. If a reference is formed to an object which has an ancestor which has a NoReference relationship then it will be reparented. If a reference is formed from a static or heap-allocated object and the current reference is from an automatic object then the object will be reparented. Some examples of typical reference changes in a C++ program are covered to demonstrate the application of the re-parent rules.

BINARY-TREE STRUCTURE

Figure 19:
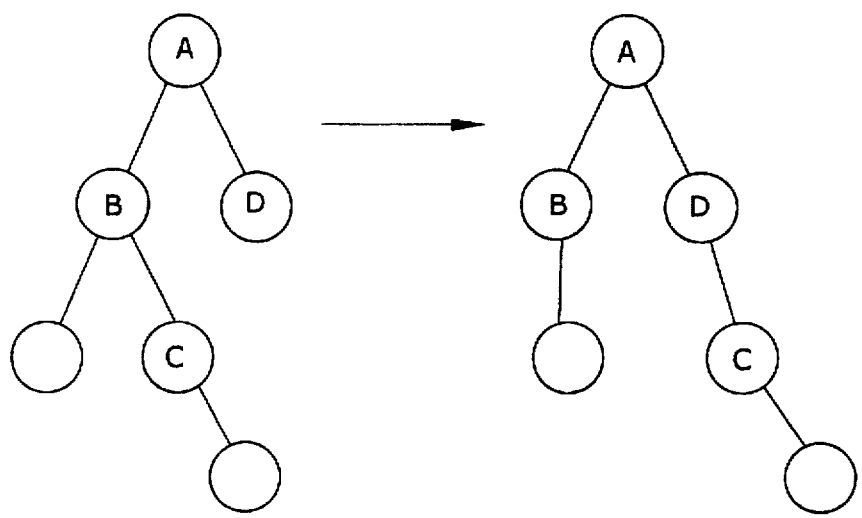
FIG. 19 depicts changing binary tree structure in accordance with practice of the invention.

The processing of a binary-tree structure is illustrated in FIG. 19. Each object is a instance of a BinaryNode class. Each BinaryNode has two members—a left pointer to a BinaryNode instance an a right Pointer to a BinaryNode instance. In this case the operation being performed in the program is to move the subtree under C to be under D.

One sequence of operations to do this could be that the reference from B to C is first deleted. Then the right pointer member of D is set to the address of C. In this case the illustrated embodiment would detect the invalidation of the B-C reference and would first re-parent C to the [Global] object with a NoReference relationship. When the D-C reference was formed C would be reparented under D.

Alternatively, the reference D-C could be formed first, and then the B-C reference overwritten. In this case when the D-C reference was created nothing would happen as there is no rule to prefer this reference as the parent reference. When the B-C reference is removed then C must be reparented. Its existing references are checked for a suitable new reference parent. The references to its child objects are rejected as they would create circular relationships. The reference from D is chosen and C is reparented.

LIST-BASED TREE STRUCTURE

Figure 20:
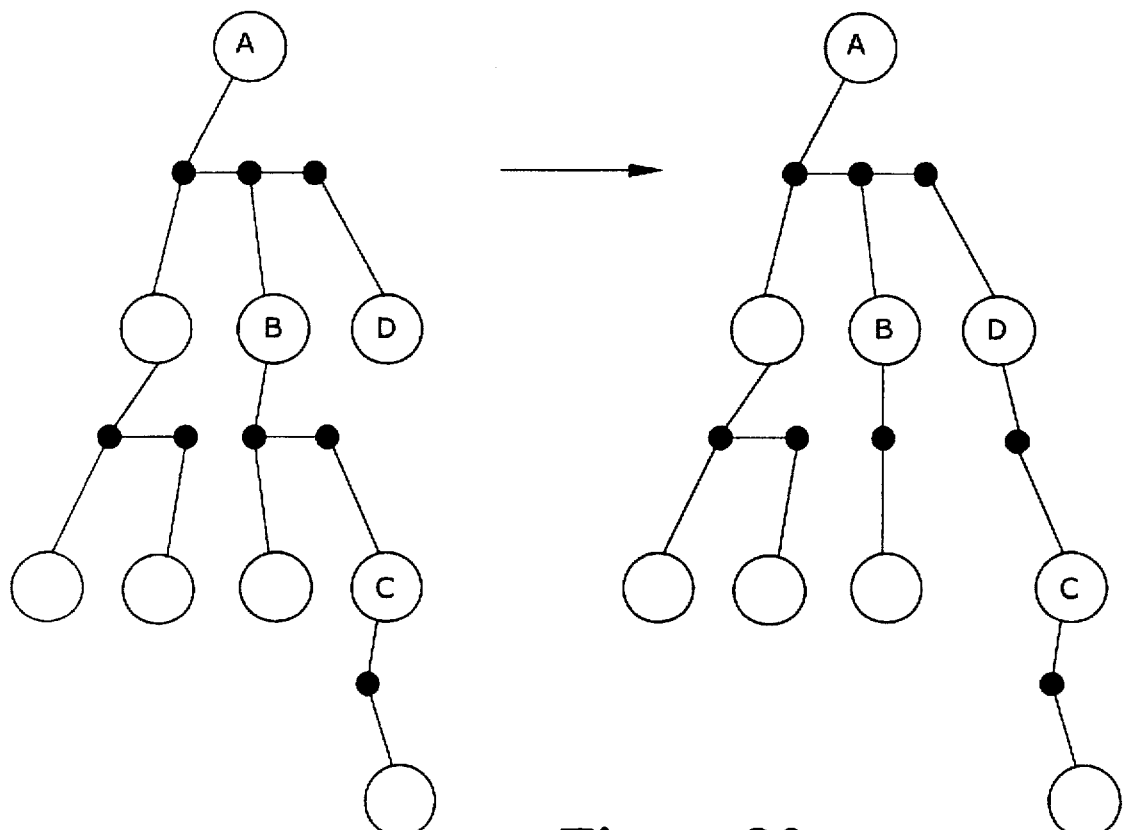
FIG. 20 is a changing list-based tree structure described in accordance with practice of the invention.

The processing of a list-based tree structure is illustrated in FIG. 20. In this case the tree is comprised of Node objects linked by ListItem objects. Each Node instance in the tree can have any number of child Node instances and a list is used to hold the set of child Nodes. Each child Node has an associated "holder" ListItem instance which points to it and maintains its position in the list.

In this case, one possible way of processing the move of C to D is for the holder item for C to be deleted and then a new holder item created, attached to end of the list for node D and made to reference C (this is an inefficient way of doing it, but general linked list changes are covered in the next section).

When the holder for C is deleted all references from the holder object are marked as invalid. C's current parent_reference is to its holder, so it now reparented to [Global] via a NoReference relationship. A new ListItem is created by A and made to point to C. The ListItem is initially parented under A with a has_created relationship. When the reference to C is made C is reparented under the ListItem as the new reference is not circular, and is a "real" reference which is preferred to its current NoReference parent reference. The ListItem is then appended to the child list for D. When the reference is made from the last ListItem in the existing list to the new ListItem then the holder for C is reparented under it as this new relationship is preferred to its current has_created parent_reference.

DOUBLY-LINKED LIST STRUCTURE

Figure 21:
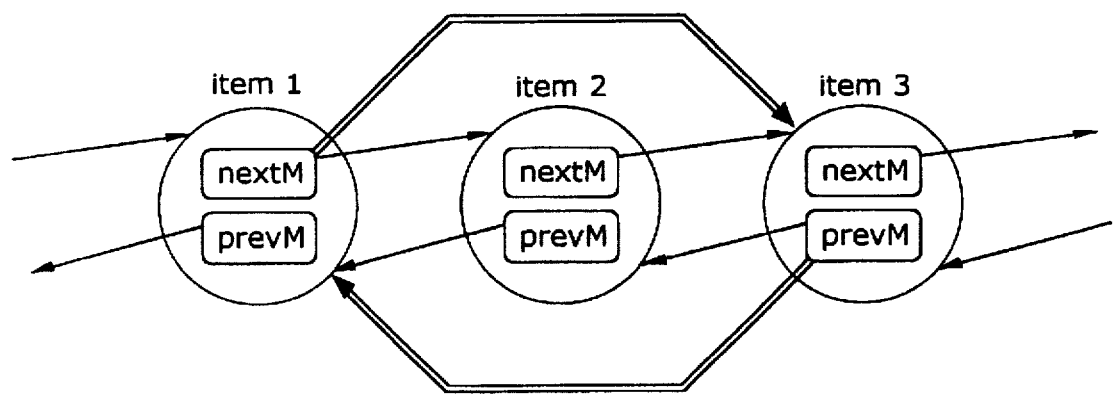
FIG. 21 is a changing doubly-linked list described in accordance with practice of the invention.

The processing of a doubly-linked list is illustrated in FIG. 21. In this scenario, the element item2 is to be removed from the list from between item1 and item3. To so this the nextM data member of object item1 is set to reference item3, and data member prevM of object item3 is set to reference item1. Setting the item1 nextM member to item3 will break the item 1 nextM→item2 relationship and as item2 does not have any other suitable parent relationships it will be reparented to [Global] with a NoReference relationship. As part of the same action a reference from the item 1 nextM member to item3 has been formed. As item3 now has an ancestor which has a NoReference parent relationship this new reference will take preference and item3 will be reparented under item 1.

ARRAY-BASED TABLE STRUCTURE

Figure 22:
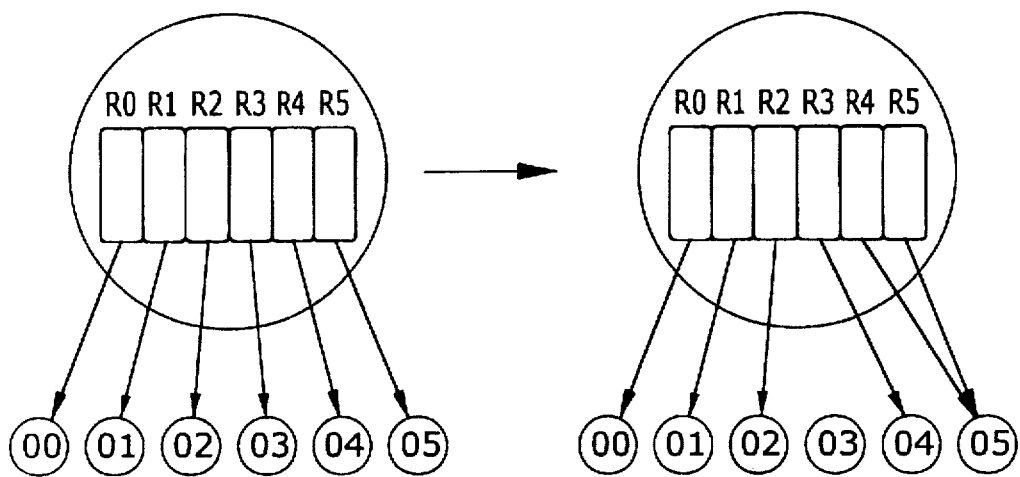
FIG. 22 is a changing reference array described in accordance with practice of the invention.

The processing of an array-based table structure is illustrated in FIG. 22. In this scenario an object has an internal array which is used to hold references. When a reference is deleted from the table the elements above it are shuffled down in order not to leave gaps. Reference R3 is to be removed. Reference R4 overwrites R3 and R5 overwrites R4. When R4 overwrites R3 object O3 is reparented to the [Global] object with a NoReference relationship. Object O4 is leer where it is as A now has two references to it. When R5 overwrites R4 O4 is reparented to its second reference to A so there is no change in its position. No change is made to O5 as there are now two references from A to O5.

DYNAMICALLY-ALLOCATED ARRAY STRUCTURE

The processing of a dynamically-allocated array structure is illustrated in FIG. 23A. A write has occurred in the context of a method C1::M1. When the current Object instance O1 is determined its associated Class instance C1 is checked to determine if it marked as using dynamically allocated memory. This attribute is set so the check for whether the object contains the target address is done on the calculated bounds of the dynamically allocated array rather than the object address range. For example, when a memory write is done from C1::M1, a check is made to determine whether the write is into memory area M1 or into memory area M2. If the write is within that range then the element at that address is read, and the ObjectReference instances for the object checked to determine if a relationship is being broken. If the array element is being written to for the first time and the calculated value is a valid object identifier then only a new ObjectReference instance is created. As can be seen, apart from this shift in checking a memory range calculated from the object members, rather than checking the range containing the members, processing of reference changes proceeds as before.

LIST-BASED HASH TABLE STRUCTURE

The processing of a list-based hash table is illustrated in FIG. 23. A hash table is typically implemented as a dynamically allocated array of references to ListHeader objects of fixed length. For this example, if an element is added at a previously empty slot in the array then assume that the hash table method first creates a ListHead object, then a ListItem object, then writes the identifier of the ListHead object in the table. It then calls a method on the ListItem object to make it refer to the object being stored and calls an append operation on the ListHead object passing in the identifier of the ListItem object.

The ListHead object will be created and attached to the hash table object with a has_created relationship. The ListItem object will be created and attached to the Hash-Table object with a has_created relationship. Then a write to the hash table is detected (HashTable has been described as a DynamicMemoryBased class to the illustrated embodiment) As no reference was previously detected for that entry an ObjectReference and ObjectReferenceEvent will be generated for the write. As the ListHead only has a has_created parent relationship, its parent_reference will change to the new relationship, although it will remain patented under the hash table. When the identifier of the object to be stored is written into the ListItem object it may or may not be reparented. If it only a has_created parent_ reference or has an ancestor NoReference relationship it will be moved, otherwise not. When the identifier of the ListItem is written into the ListHead object the ListItem object will be reparented under the ListHead object as the new reference is preferred to its existing has_created parent reference.

VISUAL REPRESENTATION OF OBJECT PROGRAMS

A screen dump of an active view of the illustrated embodiment is shown as FIG. 16. Each object is represented by an icon. The icons can represent the class of the object or the type of memory used for the object, or both. If an object is active the color of the icon changes. Similarly error or warning states are color-coded. A natural and straightforward extension is to allow object representations which change their pictorial state as the data inside the object changes.

The name of the object is placed above the object, and may be truncated according to the spacing of the view. Object relationships are shown as directed lines on the diagram. If an object is active, labels representing the active methods are shown superimposed on the icons. If an object has more than one method active on it at a time (because it has recursively called its own methods) then these are shown stacked on top of one another, slightly overlapped. Arrow pairs indicate the direction of current method invocations between objects, one arrow emerging from the sending object and a second arrow entering the receiving object. Additional dotted lines show reference relations in addition to those selected to lay out the objects as a tree.

QUERYING THE PROGRAM MODEL FROM THE USER-INTERFACE

Figure 18:
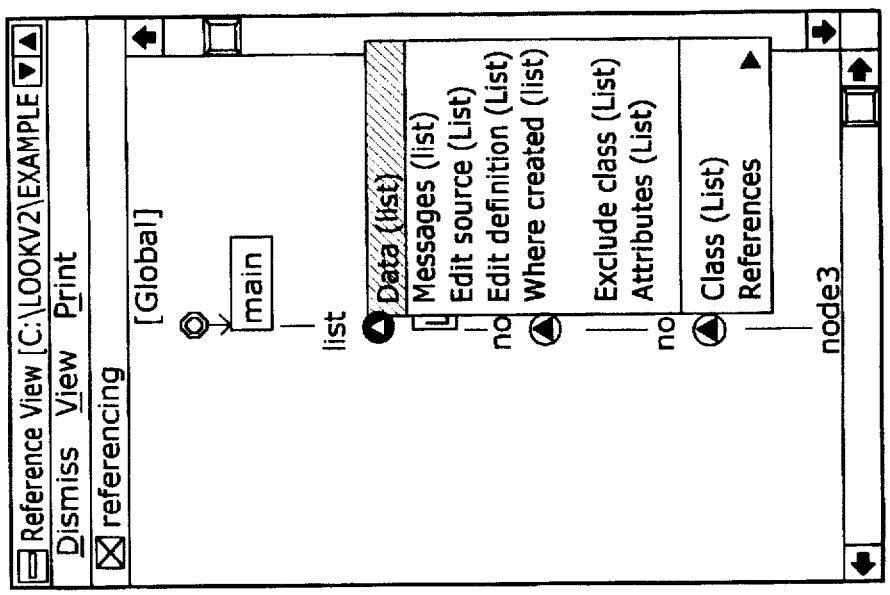
FIG. 18 is an illustration of a display created by an embodiment of invention showing a list with a query menu popped up on one of the displayed objects.
Figure 17:
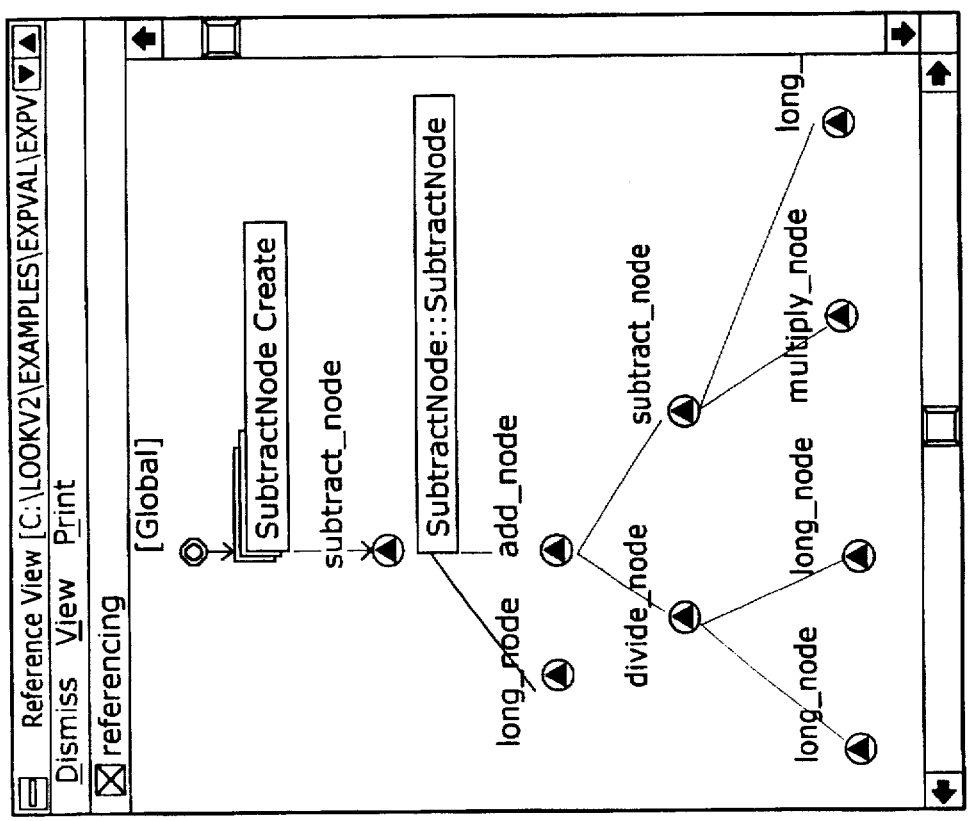
FIG. 17 is an illustration of a display created by an embodiment of invention immediately after the re-parenting operation

If the user halts execution by pressing the stop button on the control panel, all parts of the reference view become active. If the mouse is clicked on an object or a method label or reference a popup menu is displayed which lists the query actions available on the object. An object menu of the illustrated embodiment is shown in FIG. 18.

Selection of an action causes the program model in the monitor component to be queried and the results are displayed in a new window, either showing aspects of the internal data, or showing the underlying source code. Selected objects can be excluded to prevent their being monitored further.

GRAPHICAL OBJECT LAYOUT

Object icons are presently only laid out as object trees. A selected set of reference relationships are chosen to maintain the tree format. However, all other relationships can also be simultaneously displayed. All processing of reference relationships is done in the monitor subsystem, after an event is processed it may send messages to create and delete references and re-parent objects to the user interface. These messages are simply acted upon by the user interface.

OBJECT ACTIVITY FILTERING

Object programs of any reasonable size will generate too much dynamic information, even at the object level, to allow all object activity to be shown. The illustrated embodiment thus allows for filters to be imposed to cut out unwanted activity. Filters are of two types—static filters and dynamic filters.

STATIC FILTERING

Static filtering completely excludes selected classes or functions. BreakPoints are not placed on any of the affected functions, and so the illustrated embodiment does not monitor them in any way. Static filtering cuts out activity without imposing any performance penalty but prevents the detection of object relationship changes in the excluded parts of the program. It also prevents the subsequent examination of previously filtered activity.

DYNAMIC FILTERING

With dynamic filtering the breakpoints are left in place and the low-level events interpreted, but the object-level events are not displayed. The method of dynamic filtering stems directly from the maintenance of a static and dynamic object model of the monitored program.

Each ObjectCallEvent is checked against the set of active dynamic filters to determine if the change should be displayed. The filters take the form of an assertion about the calling object, the called object and the called method and their relationships to the rest of the program model. If this assertion is true for the event being checked then the actions associated with the assertion are performed. The usual action is to exclude the event. Two example filters are given in FIG. 24.

The first excludes call events where the calling object matches the called object—i.e. recursive calls within an object. The second excludes call events from any object of class Class1 which has an object called Object1 as its parent.

from is a keyword which matches the Object instance of the calling object. to is a keyword which matches the Object instance of the called object. method matches the called Method instance. In the example two program model relationships are used: the class relationship which traverses from an Object to a Class, and the parent relationship, which links an Object with the Object with which it currently has a parent_reference relationship.

With dynamic filtering in place the formation of object relationships are still detected as long as the construction of the object has not been filtered out.

Static filtering is usually used to cut out the main areas that are not being examined. Dynamic filtering is then used to produced detailed views. In general only as much static filtering as is necessary for adequate performance should be used.

USER INTERFACE

The user interface ("uif") for the illustrated embodiment is composed of graphical windowing interface using the standard facilities available from the Windows® operating environment or X-Windows® under UNIX®. Those skilled in the art will appreciate that any standard graphical windowing system supplying facilities similar to these could be used.

Referring to FIG. 16, the user interface of the illustrated embodiment has a main window 320 for the display which holds the objects which are represented as graphical icons, e.g., 322 and 324. Lines representing the relationships between the objects are drawn onto the background of the main window. Smaller windows, e.g., 326, are placed onto the main window beside the object icons to represent active method calls, and the name of the methods are written textually in the label windows. Arrows, e.g., 328, showing the direction of communication between objects are also drawn in the background.

The objects icons are arranged in a tree according to the parent_reference relationships described above. The tree is continually updated as the monitored program executes. The tree layout is recalculated each time an object is added, deleted, or moved, but the illustrated embodiment tries to maintain the remaining objects in their current positions if possible, and only those parts of the tree which change position are redrawn. if an object in the tree has changed position the entire sub-tree below the objects must be redrawn.

POSITIONING OBJECT ICONS WITHIN THE TREE

Each screen object is represented internally by an instance of a TDisp class. Each TDisp instance holds the x and y screen co-ordinates of the object icon, and also a flag which states whether it should be redrawn or not. Each TDisp also contains a list of its child TDisp instances, and this relationship structures the tree.

The layout of the tree is done by the position method of the TDisp class which is called recursively to traverse the tree. The method is called first on the topmost node of the tree (which always represents the [Global] object). Traversal is depth-first and the description is orientated so that intuitively the bottom right element (as the tree is looked at on-screen) is positioned first.

Figure 25:
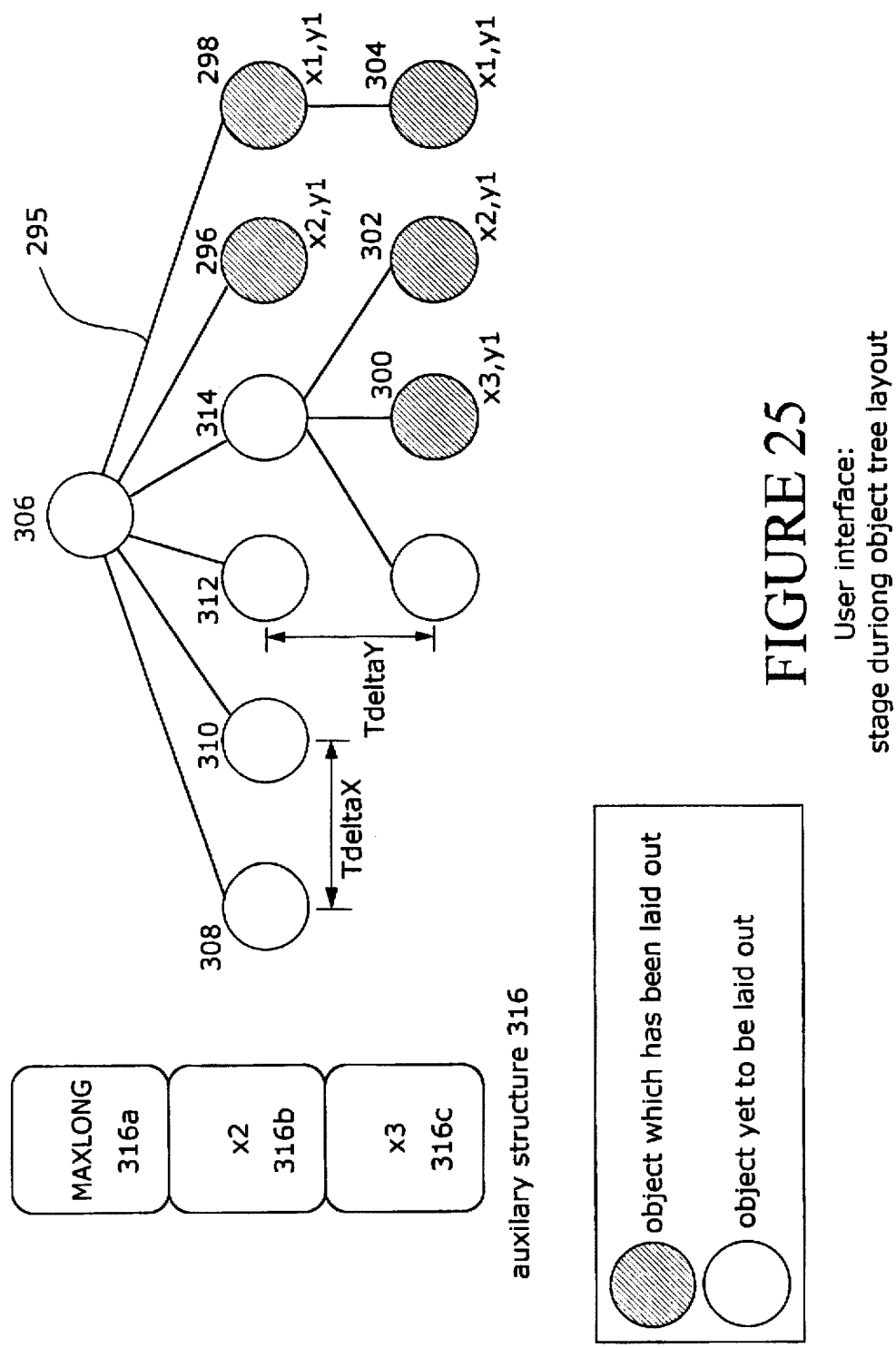
FIG. 25 illustrates a display of an object "tree" by the user interface functionality of the illustrated embodiment.

FIG. 25 represents a tree 295 midway through such a traversal. Shaded objects 296–304 have had their positions calculated, the rest 306–314 have yet to be positioned. To the left of the tree 295 there is depicted an auxiliary data structure 316 which is used during object positioning. This comprises of an array of integers 316a–316c, one for each vertical level (in the orientation shown on the figure) of the tree structure. Each element of this array contains the furthest right position at which an element in that row has been positioned. This array is used to prevent nodes being laid out in overlapping positions.

In outline, the illustrated embodiment works by calculating an estimated position for each child and then recursively calling the position method on the child node to calculate its actual position. To do this the child estimates the position of its children and recursively calls each of them to calculate their positions. The actual position for a node is determined once all the child nodes of that node have been positioned (once all the calls to position those children have returned)

Before layout starts, the array of furthest right positions is initialized so that all the elements have an impossibly large size. TDisp nodes will be positioned an amount TdeltaX apart in the x direction and an amount TdeltaY in the y direction.

To begin the layout, the position method is called on the root object of the tree with an initial (y.y) estimate of(0.0). The initial level is 0.

POSITIONING METHODOLOGY

Figure 26:
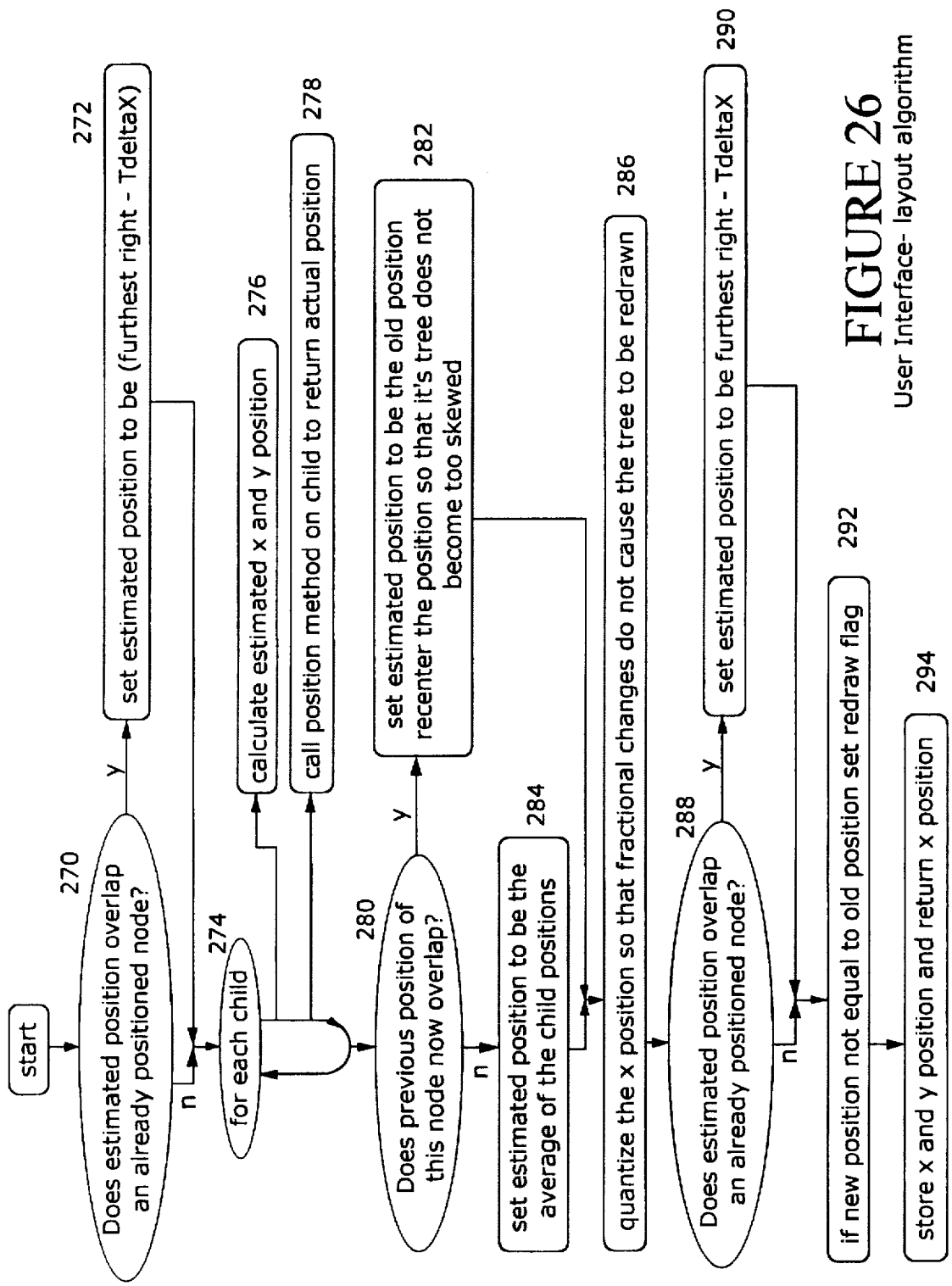
FIG. 26 is a flow diagram of an object positioning method of the user interface functionality of the illustrated embodiment.

FIG. 26 describes the procedural flow of the illustrated embodiment within the position method. The arguments to the method implementing this are the depth, the estimated x position, and the estimated y position.

The first check (step 270) is to determine if the placement of this node in the calculated x position would overlap a node which has already been positioned. This check is: if (estimated x position +TdeltaX) is greater than the current furthest right for the current level, then the estimated x position is set to (current furthest right+TdeltaX), otherwise it is left unchanged (see step 272).

For each child Node the following procedure is performed:

In accord with steps 274–278, an estimated x position is calculated as $$x = x\_position\_of\_current\_node + (total\_number\_of\_children - 2*number\_of\_times\_round\_loop - 1)*TdeltaX)/2$$

This expression estimates the spread of children as an equidistant positive and negative range from the parent's x position. For example if there are six child TDisp nodes then three would be estimated to go to the left of the parent and three to the right. Each child TDisp would be TdeltaX apart and the midpoint of the children would be directly beneath the estimated position of the parent.

The estimated y position of the child is simply the current y position+TdeltaY. The depth of the child is simply the current depth +1.

The position method is then called on the child node with the estimated x and y positions and the y depth.

The position method returns the calculated position of a node. If a node has no children it simply returns the estimated position, possibly modified by the initial overlap check.

Once the following sequence has been performed on all the child nodes, a node calculates its own x position. A node with children first checks if its current position (the position it was given the last time the tree was drawn) will cause it to overlap with nodes already laid out (step 280). This is the same check as made on entry to the method, but in this case the check is made against the currently stored x position in the TDisp. If the old value will not cause overlap then the new value is set to the old value (step 282). If it will overlap then the new value is set to the average of the child node x values (step 284). This check is designed to reduce the amount of redrawing of the tree.

However, the tree shape could eventually become deformed due to this conservative approach (The child nodes could become positioned far from their parent) and so a re-center check is made to ensure that parent nodes always have an x-position which is relatively central to their children (see step 282).

At present the recenter check moves the parent back to the midpoint of its children if the calculated position is more than TdeltaX from that midpoint, but other arrangements are possible; for example, only moving the parent x position back to the midpoint if it is outside the range of any of the child x positions.

Finally the x position of the parent is quantized (step 286), to prevent unnecessary redrawing due to fractional changes. In step 288, a check is performed to determine whether the estimated position of the new node will overlap the position of a node which has already been positioned. The x position is moved to the nearest multiple of TdeltaX/2 (step 290). A final check is done in case overlap now occurs (step 292). If it does the position is decreased (moved to the left) by TdeltaX.

If the new x position or y position is different from the old position then a flag is set to indicate that this node must be redrawn on the tree. The position method returns the calculated x position (step 294).

Class Descriptions

The descriptions below describe the inheritance relationships between classes, the data members and the methods members used in the illustrated embodiment.

For clarity, and to avoid unnecessary repetition, all get and set methods which are used to access and modify the values of the member variables have been omitted, as have the constructor and destructor methods which are provided for all classes.

Three basic classes are used to structure information: List, HashTable, and Stack. These are used by inheritance where required, but are not described in detail here as they provide only the standard containment facilities normally provided by classes of those types.

Class

Three is one Class instance created to represent each class in the monitored program.

| Base classes | None | | |
|---|---|---|---|
| Data members | data_members | List of DataMember * | |
| | base_classes | List of BaseClass * | |
| | member_functions | List of Method * | |
| | included_flag | int : 1 | |
| Methods | add_baseclass (BaseClass *) | void | return list of references between the two objects |
| | add_datamember (DataMember *) | void | |
| | add_method(Method *) | void | |
| | object_references (Object *from, Object *to) | List of ObjectReference * | |
| | include() | void | |
| | exclude() | int | |
| | has_valid_contructors() | | |

ClassSet

There is one ClassSet instance, it holds all the classes in the program and allows operations to be applied to all classes.

| Base classes | None | standard container class |
|---|---|---|
| Data members | number_of_classes | int |
| Methods | add(Class *) | void |
| | lookup(Class *) | Class * |
| | include(char *name) | void |
| | exclude(char *name) | void |

Argument

The Argument class describes the arguments to each method.

| Base classes | None | | |
|---|---|---|---|
| Data members | type | Type* | |
| | stack_offset | long | |
| | register | int | |
| | name | char * | |
| Methods | format() | char * | return printable representation of argument address of argument in program |
| | value_pointer() | void * | |

BaseClass

Each baseclass instance represents the use of a class as a baseclass. If defines where the data for that base appears in the make-up of the overall class.

| Base classes | None | |
|---|---|---|
| Data members | name | char * |
| | offset | long |
| | is_virtual | int |
| | class | Class * |
| Methods | | |

DataMember

The DataMember class defines where a data member appears in an object and its type.

| Base classes | None | |
|---|---|---|
| Data members | name | char * |
| | offset | long |
| | type | Type * |
| | static_flag | int |
| Methods | object_reference(Object *from, Object *to) | ObjectReference * (or 0) |

Method

The Method class defines a method in a program.

| Base classes | None | | |
|---|---|---|---|
| Data members | name | char * | |
| | address | Address_t | machine dependent, usually 32 bit number |
| | return type | Type * | |
| | arguments | List of Argument * | |
| | class | Class * | |
| | included_flag | int : 1 | |
| | constructor_flag | int : 1 | |
| | destructor_flag | int : 1 | |
| Methods | include() | void | |
| | exclude() | void | |
| | set_call_breakpoint() | void | |
| | set_write_breakpoints() | void | |

MethodSet

This holds all the methods in the program, and allows actions to be applied across them all.

| Base classes | HashTable | standard container class |
|---|---|---|
| Data members | number_of_functions | int |
| Methods | include(char *) | void |
| | exclude(char *) | void |
| | set_breakpoints(); | void |
| | remove breakpoints() | void |

Object

This represents an object in the monitored program.

| | | | |
|---|---|---|---|
| Base classes | None | | |
| Data members | name | char * | |
| | creation_children | List of Object * | |
| | object_references | List of ObjectReference * | If [Global] its a NoReference. If 0 then not set up yet. |
| | address | Address_t | |
| | class | Class * | |
| | instance | int | |
| | create_event | ObjectCreateEvent * | |
| | creation_parent | Object * | |
| | reference_parent | Object * | |
| | top_destructor | Object * Method * | |
| Methods | references(Object *) | List of ObjectReference * | |
| | has_noref_ancestor() | | |
| | check_reference_change (MemoryWriteEvent *) | int void | |
| | one_level_dereference_check(Memory WriteEvent *) | void | |

ObjectId

This uniquely represents a valid address for an object, or a base or aggregate part of that object (any address within the object to which methods could validly be applied).

| | | | |
|---|---|---|---|
| Base classes | None | | |
| Data members | object | Object * | |
| | class | Class * | The class is the class of the part of the object |
| | address | Address_t | |
| Methods | | | |

PotentialFirstRef

This stores an argument passed to a method which could be stored by the method to form a new first reference between objects.

| | | | |
|---|---|---|---|
| Base classes | None | | |
| Data members | to_object | Object * | |
| | object_id | ObjectId * | |
| Methods | process(List of ObjectReference *) | | check to see if the argument has been stored in the object (in one of the ObjectReference *) If it has create an ObjectReferenceEvent. |

MethodCall

There is a MethodCall instance for each active method call, i.e. each method on the call stack.

| | | |
|---|---|---|
| Base classes | None | |
| Data members | callevent | CallEvent * |
| | potential_first_refs | List of PotentialFirstRef * |
| | message_stack | MessageStack * |
| Methods | process_first_refs() | void |
| | check_local_variables (MemoryWriteEvent *) | void |

MethodCallStack

The method call stack keeps all current method call in order.

| | | |
|---|---|---|
| Base classes | Stack | Standard stack class |
| Data members | callevent | CallEvent * |
| | potential_first_refs | List of PotentialFirstRef * |
| | message_stack | MessageStack * |
| Methods | push(MethodCall *) | void |
| | pop() | void |
| | call(int position) | MethodCall * |

ObjectReference

Instances of the ObjectReference class hold details of the reference of one object by another in the invention.

| | | | |
|---|---|---|---|
| Base classes | None | | |
| Data members | to_object_id | ObjectId * | |
| | data_member | DataMember * | |
| Methods | | | |

ObjectIdTable

The object id table holds all valid object identifiers known by the monitoring program.

| | | | |
|---|---|---|---|
| Base classes | HashTable | | |
| Data members | number of classes | int | |
| | class_ids | ObjectId * | hash table entries |
| Methods | lookup(ObjectId *) | ObjectId * | A temporary ObjectId is created with the desired address/class to specify the object searched for |
| | insert(ObjectId *) | int | |
| | remove(ObjectId *) | int | |

ObjectEvent

ObjectEvent is the base class for all the various types of ObjectEvent. In the main class diagram only the Object-Event base class is shown, to represents all its possible subclasses.

| Base classes | None | | |
|---|---|---|---|
| Data members | event_on | Object * | |
| Methods | process(char *buffer) | char * | process this event to determine whether the UIF should be alerted to it or not. |

ObjectCreateEvent

Describes the creation of an object.

| Base classes | ObjectEvent | | |
|---|---|---|---|
| Data members | object_call_event | ObjectCallEvent * | |
| Methods | format(char *) | char * | process this event to determine whether the UIF should be alerted to it or not. |

ObjectCallEvent

Describes the invocation of a method on an object.

| Base classes | ObjectEvent | | |
|---|---|---|---|
| Data members | caller | Object * | |
| | method | Method * | if call not shown do not show return |
| | was_excluded | int | |
| Methods | process(char *) | char * | process this event to determine whether the UIF should be alerted to it or not. |

ObjectReturnEvent

Describes the return of a method invoked on an object.

| Base classes | ObjectEvent | | |
|---|---|---|---|
| Data members | call_event | CallEvent* | |
| Methods | process(char *) | char * | analyse in context of current filtering whether to a send a message to the UIF or not. |

ObjectDeleteEvent

Describes the deletion of an object.

| Base classes | ObjectEvent | | |
|---|---|---|---|
| Data members | return_event | ObjectReturnEvent* | |
| Methods | process(char *) | char * | determine to send a message to the UIF or not. |

ObjectReferenceEvent

Describes the formation of a reference from one object to another

| Base classes | ObjectEvent | | |
|---|---|---|---|
| Data members | referring_object | Object * | |
| | object_reference | ObjectReference * | |
| Methods | process(char *) | char * | determine to send a reparent message to the UIF or not. |

WarnEvent

Describes a possible error in the monitored program

| Base classes | ObjectEvent | | |
|---|---|---|---|
| Data members | message | char * | warning message |
| Methods | process(char *) | char * | determine to send a reparent message to the UIF or not. |

StopEvent

Instructs the user interface to stop animation and move to a halted state caused by a dynamic filtering action being executed.

| Base classes | ObjectEvent | | |
|---|---|---|---|
| Data members | message | char * | stop message |
| Methods | process(char *) | char * | determine to send a reparent message to the UIF or not. |

ObjectEventList

This holds a trail of all object events in the program being monitored.

| Base classes | List | | standard container class |
|---|---|---|---|
| Data members | None directly - list of ObjectEvent * held in base class | | |
| Methods | | | |

ObjectEventSet

This holds the set of all the object events derived from analysing the current lowlevel event.

| Base classes | List | | standard container class |
|---|---|---|---|
| Data members | List of ObjectEvent* | | |
| Methods | insert(ObjectEvent *) | void | |
| | process(char *) | char * | |

DynamicFilter

Dynamic filters are C++-type expressions which determine whether a particular call should be shown or not on the user interface.

| Base classes | List | | standard container class |
|---|---|---|---|
| Data | name | char * | |

-continued

| | | | |
|---|---|---|---|
| members | expression actions | Expression * List of Action* | The expression holds the query to be checked as a tree in the normal way of representing expressions. The important actions are simply "stop" and "exclude". |
| Methods | call_event_actions (CallEvent *) | List of Action * or 0 | check if the call event matches the expression. If it does the actions are executed. |

ReparentingRule

Checks whether an ObjectReferenceEvent should result in a reparent message being sent to the UIF. At present each rule is implemented procedurally.

| | |
|---|---|
| Base classes | |
| Data members | |
| Methods | process(ObjectReferenceEvent *) |

LowLevelEvent

The low level event is the basis for all the subsequent processing done by the monitor subsystem. It is converted into one or more object level events which are then send to the user interface, dependent on the filtering and reparenting criteria currently in force. LowLevelEvent is a virtual base class and so an instance of it is never actually created. The correct type of processing is selected polymorphically according to the actual type of event created. On the main class diagram only the base LowLevelClass is shown, to represent all its possible sub-classes.

| | | | |
|---|---|---|---|
| Base classes | None | | |
| Data members | object_id method breakpoint | Address_t Method * BreakPoint * | the address of the object in the monitored program |
| Methods | process() | void | |

MethodCallEvent

Created by the call of a method other than a constructor or destructor

| | | |
|---|---|---|
| Base classes | LowLevelEvent | |
| Data members | None | |
| Methods | process() | void |

ConstructorCallEvent

Created by the call of a constructor method.

| | |
|---|---|
| Base classes | LowLevelEvent |
| Data members | None |
| Methods | |

DestructorCallEvent

Created by the call of a destructor method

| | |
|---|---|
| Base classes | LowLevelEvent |
| Data members | None |
| Methods | |

MethodReturnEvent

Created by the return of a method other than a constructor or destructor.

| | |
|---|---|
| Base classes | LowLevelEvent |
| Data members | None |
| Methods | |

ConstructorReturnEvent

Created by the return of a constructor

| | |
|---|---|
| Base classes | LowLevelEvent |
| Data members | None |
| Methods | |

DestructorReturnEvent

Created by the return of a destructor

| | |
|---|---|
| Base classes | LowLevelEvent |
| Data members | None |
| Methods | |

MemoryWriteEvent

Created by the calling of a write instruction within the context of the current method call.

| | | |
|---|---|---|
| Base classes | LowLevelEvent | |
| Data members | target_address target_value | Address_t long |
| Methods | evaluate_target_address() evaluate_target_value() | Address_t long |

MemoryWriteEvent

Created by the calling of a write instruction within the context of the current method call.

| | | |
|---|---|---|
| Base classes | LowLevelEvent | |
| Data members | target_address target_value | Address_t long |
| Methods | evaluate_target_address() evaluate_target_value() | Address_t long |

Type

The Type class provides a uniform interface between the monitor code and whatever form of type information is provided as part of the debugging information, which is used in its original form. The methods look up the original type system and extract the required information

| | | | |
|---|---|---|---|
| Base classes | None | | |
| Data members | index | long | index into the original type system |

-continued

| Methods | decl() | char * | returns the type as a printable string |
|---|---|---|---|
| | next_type() | Type * | |
| | size() | ulong | if this type is a pointer then return type pointed to |
| | isa_pointer() | int | |
| | isa_string_pointer() | int | |
| | isa_class_pointer() | int | |

BreakPoint

This represents the breakpoint instructions which has been inserted into the monitored program in place of one of the original instructions.

| Base classes | None | | |
|---|---|---|---|
| Data members | Method type address old_instruction | Method * int. Address_t long | call, return, or write |
| Methods | set(); reset(); | | put bp into program remove bp from program |

MachineState

Provides the debugging interface to the monitored program

| Base classes | None | |
|---|---|---|
| Data members | Operating System dependent | |
| Methods | load(char *file, char *args) | int |
| | unload() | int |
| | start() | int |
| | stop() | int |
| | read_value(char *vp) | char |
| | read_value(short *vp) | short |
| | read_value(long *vp) | long |
| | read_value(float *vp) | float |
| | read_value(double *vp) | double |
| | write_value(char *vp, char v) | char |
| | write_value(short *vp, short v) | short |
| | write_value(long *vp, long v) | long |
| | write_value(float *vp, float v) | float |
| | write_value(double *vp, double *v) | double |

SUMMARY

Described herein is a program development tool for monitoring and controlling object-oriented programs meeting the objects set forth above. Those skilled in the art will appreciate that the illustrated embodiment is described by way of example and that other embodiments incorporating modifications thereto may fall within the scope of the invention. Thus, by way of non-limiting, for example, the controlling program of the invention may be implemented in a conventional structural programming language, as well as in an object-oriented language as described above. These and other such modifications fall within the scope of the invention, of which

I claim:

1. A method of monitoring execution of an object-oriented computer program on a digital data processor with a memory, said method comprising the steps of:

A. determining a state of said digital data processor when said monitored computer program reaches selected points during execution, B. determining from the state of said digital data processor at each selected points a status of at least one object forming part of said monitored computer program, C. generating a dynamic program model from the digital data processor states determined in step B, the model containing an element representative of each object existing in the memory, and relationships therebetween, D. generating a display from the model, the display having elements representing at least some of the objects existing in memory and the relationships therebetween, and E. updating the display substantially concurrently with execution of said monitored computer program so that an active picture of objects and their relationships is displayed as said monitored computer program executes.

2. A method according to claim 1, including the step of analyzing the monitored computer program and automatically inserting breakpoints into the monitored computer program to cause said monitored computer program to temporarily stop at said selected points.

3. A method according to claim 1, including the steps of
responding to user input to statically filter any of a selected class and a selected function to prevent the status of said selected objects from being determined therefrom,
responding to user input to dynamically filter display of selected objects and relationships therewith.

4. A method according to claim 1, including the steps of generating a static program model representative of object-oriented constructs, including at least one of classes, methods, method arguments, objects and member types, of said monitored program,
generating a dynamic program model representative of at least one of (i) objects in existence during execution of said monitored program, (ii) relationships between those objects, (iii) valid addresses for those objects and parts thereof, (iv) a current stack of method invocations, and (v) a current state of said digital data processor,
interpreting said state of said digital data processor in view of said static model and said dynamic model to determine said status of objects created by said monitored computer program.

5. A method according to claim 4, including the step of generating said static program model from at least one of debug information associated with said monitored computer program and a definition of the monitored program itself.

6. A method according to claim 4, wherein at least one of said dynamic program model and said static program model comprise objects representing respective aspects of said monitored program and digital data processor.

7. A method according to claim 4, including the steps of
maintaining in said dynamic program model a table for mapping object identifiers to storage addresses of objects used by the monitored computer program,
responding to a method call to a constructor method for which (i) the prior most recent method call that was itself a constructor method call and (ii) the object in which said constructor method call is contained is any of a base or aggregate object, for adding to said table an entry mapping an identifier of the object in which said constructor method call is contained to a storage address for that object.

8. A method according to claim 1, including the steps of
setting breakpoints to suspend execution of said monitored computer program at selected points during execution therefor,
responding to suspension of execution of said monitored computer program at such breakpoints for (I) determining the state of said digital data processor and the status of said selected objects upon such suspension, and (ii) updating said program model to represent the status of said selected objects upon such suspension, and (iii) resuming execution of said monitored computer program.

9. A method according to claim 8, including the steps of setting breakpoints in constructor methods of at least selected objects to suspend execution of said monitored computer program upon creation of those objects, responding to suspension of execution at a breakpoint in the constructor method of such an object for setting breakpoints in that object in any of selected method calls, method returns, and memory writes.

10. A method according to claim 1, including the step of determining said state of said digital data processor during execution of any of a method call, a method return, and a memory write by said monitored computer program.

11. A method according to claim 10, including the steps of responding to a method call by said monitored computer program by identifying at least one of (i) a calling object that made the method call, (ii) a called method that is an object of the method call, and (iii) a called object containing the called method, and selectively updating said display to represent invocation of the called method and creation, if any, of said called object by the calling object.

12. A method according to claim 11, including the step of responding to a method return by said monitored computer program for selectively updating said display to represent completion of the corresponding method destruction, if any, of the corresponding object.

13. A method according to claim 10, including the step of responding to a method call to a constructor method by determining whether an object in which that method is contained is being newly created and, if so, by updating said display to represent such creation.

14. A method according to claim 13, including the step of determining whether the object in which said constructor method call is contained is newly created by examining at least one of a prior most recent method call and a type of that object.

15. A method according to claim 13, including the steps of generating a dynamic program model representative of at least one of objects in existence during execution of said monitored program, relationships between those objects, valid addresses for those objects and parts thereof, a current stack of method invocations, and a current state of said digital data processor, interpreting said state of said digital data processor at least in view of said dynamic program model to determine said status of objects created by said monitored computer program.

16. A method according to claim 15, including the steps of maintaining in said dynamic program model a table for mapping object identifiers to storage addresses used by the monitored computer program for objects used by that program, responding to a method call by said monitored computer program to a constructor method for which (i) the prior most recent method call that was itself a constructor method call and (ii) the object in which said constructor method call is contained is any of a base or aggregate object, for adding to said table an entry mapping an identifier of the object in which said constructor method call is contained to a storage address for that object.

17. A method according to claim 13, including the step of responding to a determination that an object is being newly created for by updating said display to represent a creation relation between that object and an object which created it.

18. A method according to claim 17, including the step of responding to at least a first reference to an object by another object for updating said display to represent a referencing relation between those objects.

19. A method according to claim 18, including the steps of responding to a method call having an argument designating an object amenable to reference by marking that an object as a potential subject of reference, responding to a return by that same method for determining whether that object has since been referenced by another object and, if not, by marking that object as first referenced by an object that invoked that method call, updating said display to represent a referencing relationship between the object represented by the method call argument and the object that invoked the method call.

20. A method according to claim 17, including the step of responding to any of a first and subsequent reference to an object by another object for updating said display to represent a referencing relation between those objects.

21. A method according to claim 10, including the step of responding to a method return from a destructor method by updating said display to reflect destruction of an object in which that destructor method is contained.

22. A method of monitoring execution of an object-oriented computer program on a digital data processor, said method comprising the steps of A. determining a state of said digital data processor at selected points during execution of said monitored computer program by (I) analyzing said monitored computer program and setting breakpoints to suspend execution of that program at selected points based on said analysis, (ii) responding to suspension of execution of said monitored computer program at such breakpoints for (a) determining the state of said digital data processor upon such suspension, and (b) resuming execution of said monitored computer program, B. determining from the state of said digital data processor a status of all objects created by said monitored computer program at each of those selected points by (I) generating a static program model representative of object-oriented constructs, including at least one of classes, methods, methods arguments, objects and member types, of said monitored program, (ii) generating a dynamic program model representative of (I) objects in existence during execution of said monitored programs, (ii) relations between those objects, (iii) valid addresses for those objects and parts thereof, (iv) a current stack of method invocations, and (v) a current state of said digital data processor, (iii) interpreting said state of side digital data processor in view of said static model and said dynamic model to determine said status of objects created by said monitored computer programs, and C. using the status determined in step B to generate a dynamic graphical display representative of a status of selected objects, and relationships therebetween, at said selected points concurrent with execution of said monitored program.

23. A method of monitoring execution of an object-oriented computer program on a digital data processor, said method comprising the steps of
   A. determining a state of said digital data processor at selected points during execution of said monitored computer program by
      (I) setting breakpoints to suspend execution of that program during execution of any of a method call, a method return, and a memory write by said monitored computer program,
      (ii) responding to suspension of execution of said monitored computer program at such breakpoints for
         (a) determining the state of said digital data processor upon such suspension, and
         (b) resuming execution of said monitored computer program,
   B. determining from the state of said digital data processor a status of all objects created by said monitored computer program,
   C. generating from the status determined in step B a dynamic graphical display representative of a status of said objects, and relationships therebetween, at said breakpoints,
   D. responding to a method call to a constructor method by determining whether an object in which that method is contained is being newly created and, if so, by updating said display to represent such creation, and
   E. responding to at least a first reference to an object by another object for updating said display to represent a referencing relation between those objects.

24. A computer program product for monitoring execution of an object-oriented computer program on a digital data processor with a memory, said computer program product comprising a computer usable media having computer readable program code thereon, the computer readable program code including:
   program code for determining a state of said digital data processor when said monitored computer program reaches selected points during execution,
   program code for determining from the state of said digital data processor at each selected point a status of at least one object forming part of said monitored computer program,
   program code for generating a dynamic program model from the determined digital data processor states, the model containing an element representative of each object existing in the memory, and relationships therebetween,
   program code for generating a display from the model, the display having elements representing at least some of the objects existing in memory and the relationships therebetween, and
   program code for updating the display substantially concurrently with execution of said monitored computer program so that an active picture of objects and their relationships is displayed as said monitored computer program executes.

25. A computer program product according to claim 24 wherein the program code includes program code for analyzing the monitored computer program and automatically inserting breakpoints into the monitored computer program to cause said monitored computer program to temporarily stop at said selected points.

26. A method of monitoring execution of an object-oriented computer program on a digital data processor with a memory, said method comprising the steps of:
   A. determining a state of said digital data processor when said monitored computer program reaches selected points during execution;
   B. determining from the state of said digital data processor at each selected point a status of at least one object forming part of said monitored computer program;
   C. generating a dynamic program model from the digital data processor states determined in step B, the model containing an element representative of each object existing in the memory, and relationships therebetween;
   D. generating a display from the model, the display having elements representing at least some of the objects existing in memory and the relationships therebetween;
   E. updating the display substantially concurrently with execution of said monitored computer program so that an active picture of objects and their relationships is displayed as said monitored computer program executes;
   F. determining said state of said digital data processor during execution of any of a method call, a method return, and a memory write by said monitored computer program;
   G. responding to a method call to a constructor method by determining whether an object in which that method is contained is being newly created and, if so, by updating said display to represent such creation;
   H. responding to a determination that an object is being newly created for by updating said display to represent a creation relation between that object and an object which created it;
   I. responding to any of a first and subsequent reference to an object by another object for updating said display to represent a referencing relation between those objects;
   J. responding to at least selected memory writes during execution of said monitored program for determining whether (I) a target address thereof is an object data member capable of storing an object reference and (ii) a value to be written to said target address is that of an object; and
   K. responding to positive such determinations for updating said display to represent a referencing relationship between the object containing the data member of said target address and the object referred to by said value.

27. The method of monitoring execution of an object-oriented computer program as defined by claim 26, said method further comprising the step of:
   L. setting breakpoints to suspend execution of said monitored computer program at memory write operations of at least a selected method; and
   M. responding to suspension of execution of each of said breakpoints for determining whether a target address of a suspended memory write operation is an object data member capable of storing an object reference and, it not, canceling that breakpoint.

28. The method of monitoring execution of an objected-oriented computer program as defined by claim 26, said method further comprising the steps of:
   N. setting breakpoints to suspend execution of said monitored computer program at memory write operations of at least a selected method; and O. responding to suspension of execution of each of said breakpoints for determining whether a target address of a suspended memory write operation is data member of a current object and, if not, whether that target address is of a data object in the current stack frame and, if not, for cancelling that breakpoint.

* * * * *